United States Patent

Iwata et al.

[11] Patent Number: 6,076,145
[45] Date of Patent: Jun. 13, 2000

[54] DATA SUPPLYING APPARATUS FOR INDEPENDENTLY PERFORMING HIT DETERMINATION AND DATA ACCESS

[75] Inventors: Takuya Iwata; Atsuhiro Suga, both of Kanagawa, Japan

[73] Assignee: Fujitsu Limited, Kawasaki, Japan

[21] Appl. No.: 09/211,045

[22] Filed: Dec. 15, 1998

Related U.S. Application Data

[62] Division of application No. 08/672,485, Jun. 26, 1996.

[30] Foreign Application Priority Data

Jul. 14, 1995 [JP] Japan ................................. 7-178626

[51] Int. Cl.⁷ ..................................................... G06F 12/08
[52] U.S. Cl. ......................... 711/125; 711/140; 711/144; 711/3
[58] Field of Search ................................. 711/140, 125, 711/144, 3

[56] References Cited

U.S. PATENT DOCUMENTS 5,430,888  7/1995  Witek et al. ............................. 711/140
5,802,575  9/1998  Greenley et al. ........................ 711/140

Primary Examiner—Reginald G. Bragdon
Attorney, Agent, or Firm—Armstrong, Westerman, Hattori, McLeland & Naughton

[57] ABSTRACT

An address buffer that stores information used to access a data memory is disposed in a cache unit that supplies data such as an instruction code to an instruction executing unit. A tag memory and a data memory are independently accessed. The data memory is accessed corresponding to access information stored in the address buffer. Data is output from the data memory in the input order of data requests. When a data release signal is not received from the instruction executing unit, since access information is buffered in the address buffer, a large data buffer for storing the output data of the data memory is not required. In addition, in an associative type cache unit, the tag memory and the address buffer can be formed in the same memory.

11 Claims, 21 Drawing Sheets

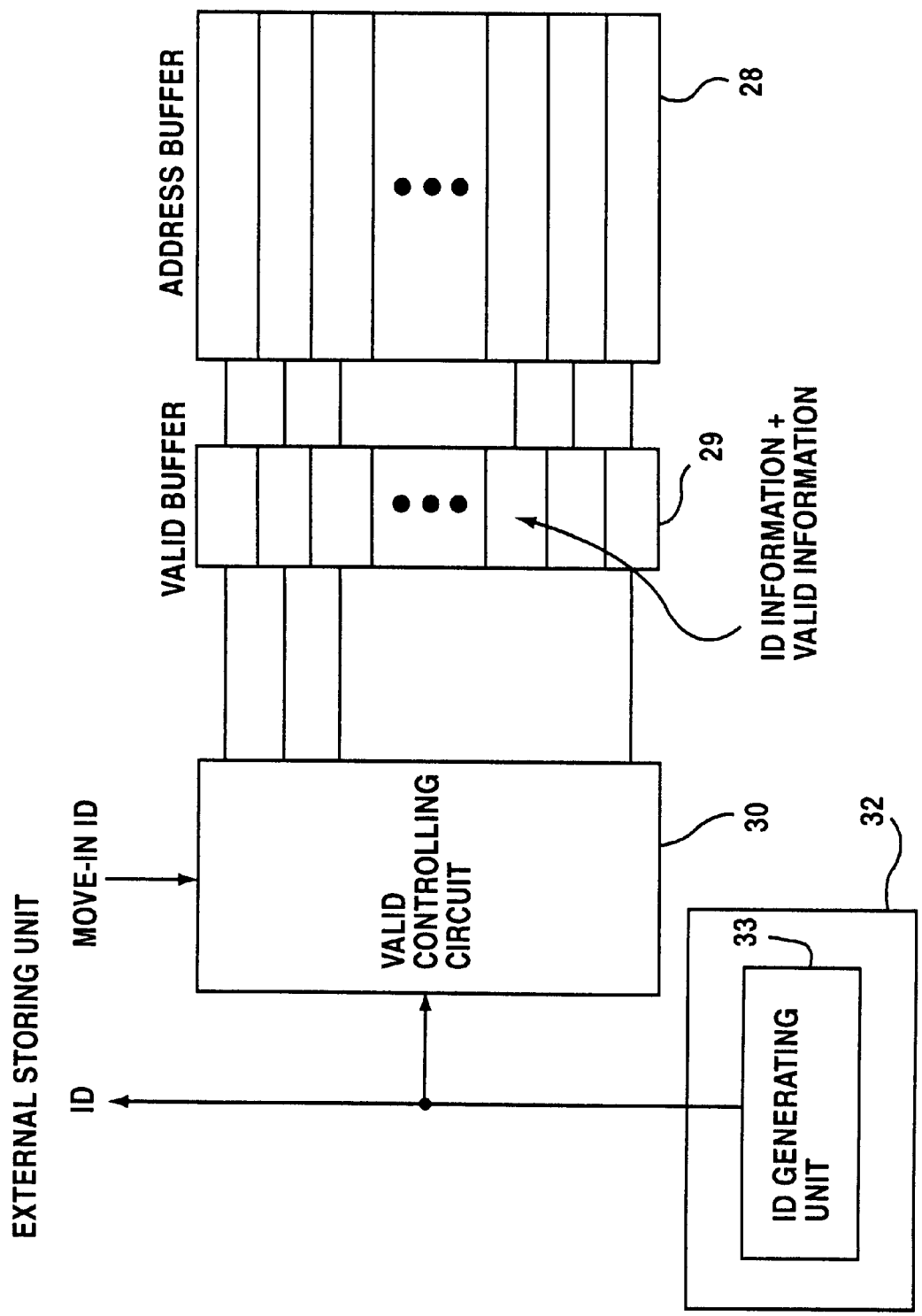

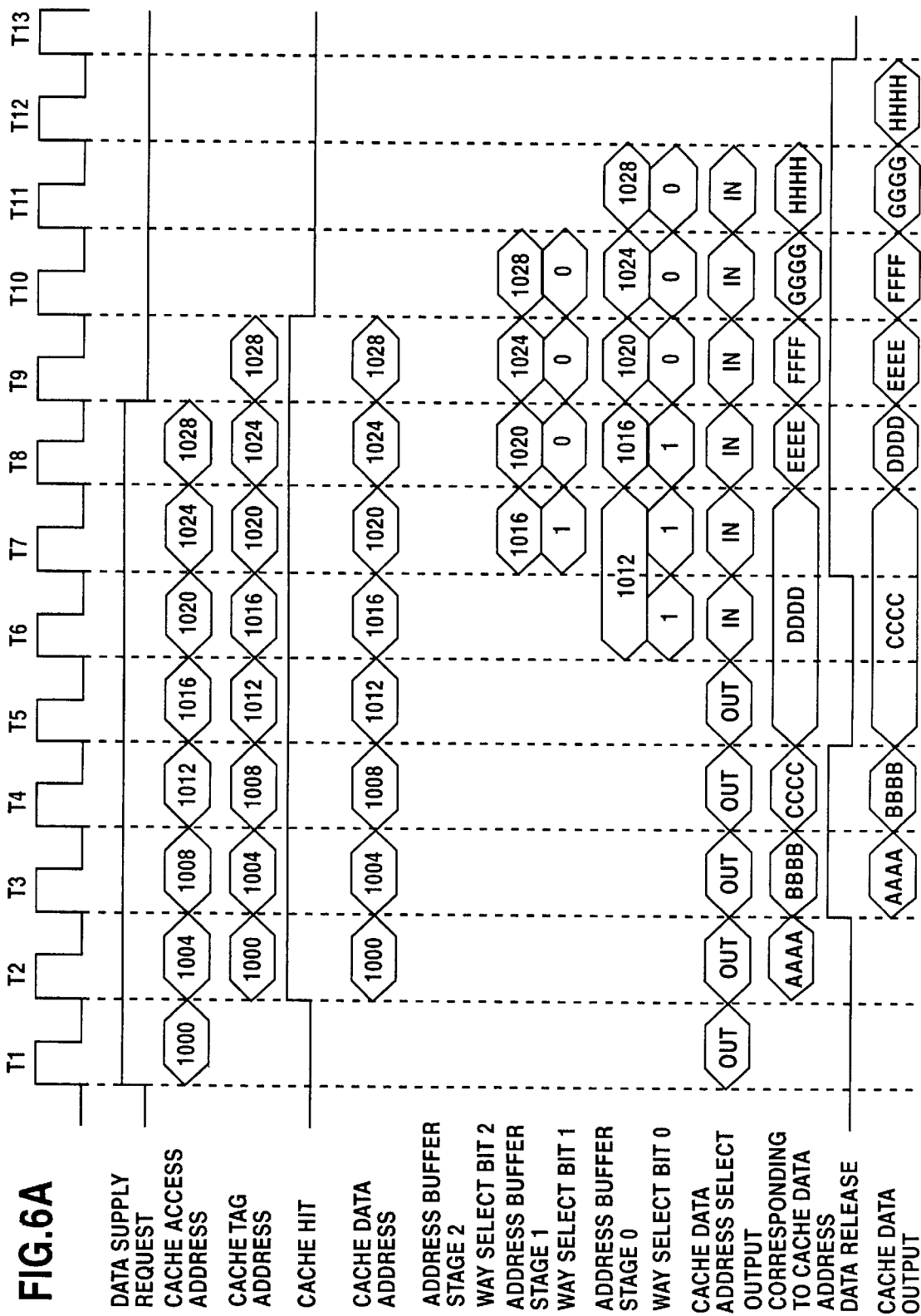

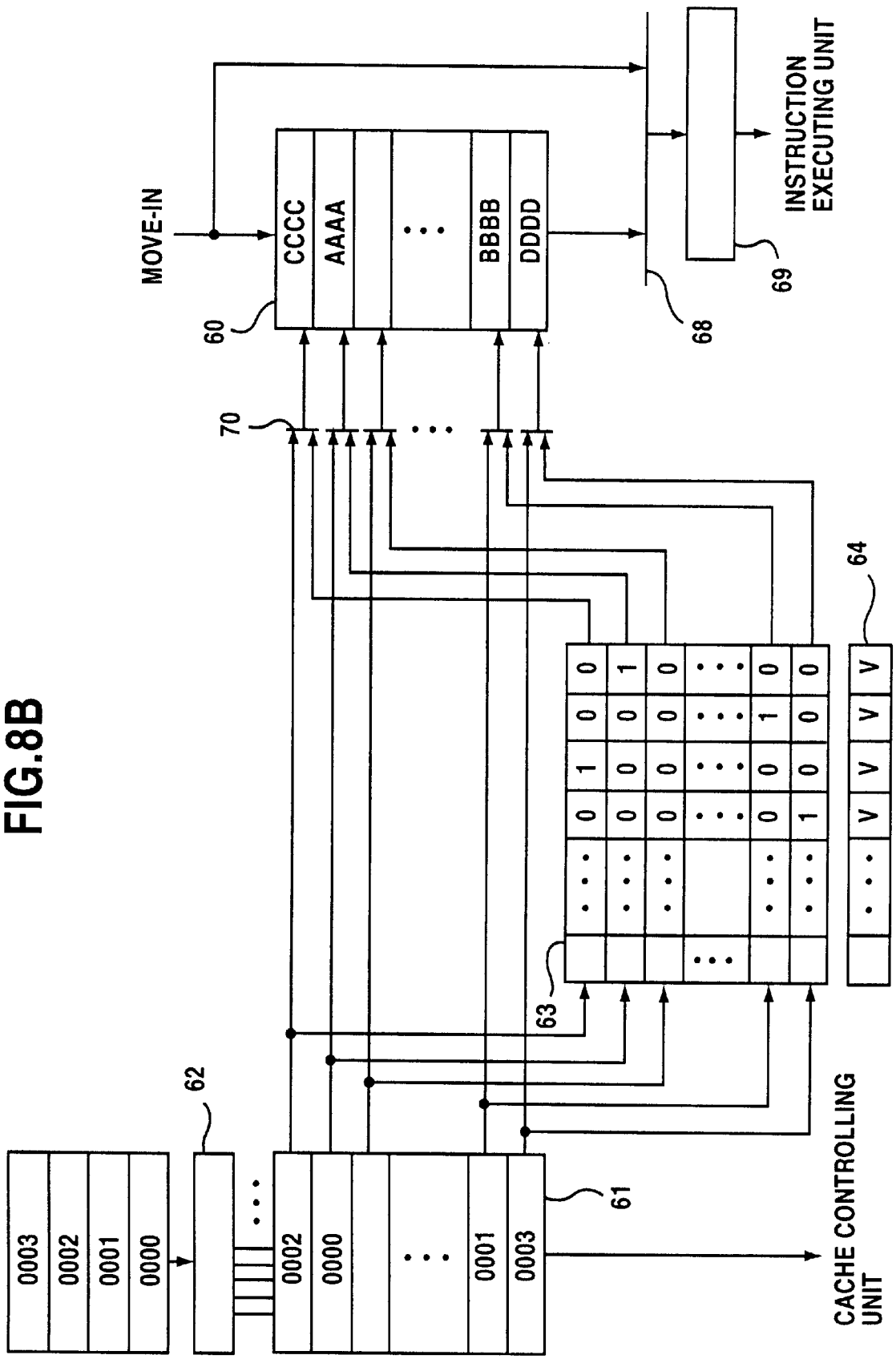

DATA SUPPLYING APPARATUS FOR INDEPENDENTLY PERFORMING HIT DETERMINATION AND DATA ACCESS

This application is a division of prior application Ser. No. 08/672,485 filed Jun. 26, 1996.

BACKGROUND OF THE INVENTION

1. Field of the Invention

The present invention relates to a data supplying apparatus for supplying instructions (instruction codes) and/or data to be processed to an instruction executing unit and, in particular, to a data supplying apparatus with a reduced structure and a simple controlling process for supplying data to the instruction executing unit.

2. Description of the Related Art

Computer systems have an instruction supplying apparatus and a data supplying apparatus. The instruction supplying apparatus is composed of an instruction cache. The data supplying apparatus is composed of a data cache. A CPU (central processing unit) pre-fetches instructions and data from these caches. To practically use the instruction supplying apparatus and the data supplying apparatus, they should be of simple structure.

FIG. 1A is a block diagram showing a structure of a conventional instruction supplying apparatus.

Referring to FIG. 1A, the conventional instruction supplying apparatus comprises a cache data unit 1, a cache tag unit 2, an instruction buffer 3, a cache controlling unit 4, and an instruction buffer controlling unit 5. The cache data unit 1 stores instructions. When the CPU supplies an address to the cache data unit, it outputs an instruction corresponding to an index included in the address. The cache tag unit 2 stores a tag. When the CPU supplies an address to the cache tag unit 2, it outputs a tag corresponding to an index included in the tag. The cache tag unit 2 determines whether the output tag hits or misses the tag included in the address and outputs the result. The instruction buffer 3 queues an instruction received from the cache data unit 1 and sends it to an instruction executing unit. The cache controlling unit 4 controls the cache data unit 1 and the cache tag unit 2. The instruction buffer controlling unit 5 controls the instruction buffer 3.

The instruction buffer 3 normally has 10 to 20 entries for queuing instructions. A large instruction buffer may have 54 entries.

The cache controlling unit 4 receives a hit/mis-hit signal from the cache tag unit 3, generates valid information that represents whether or not an instruction in the cache data unit 1 is valid, and outputs the valid information to the instruction buffer controlling unit 5. The instruction buffer controlling unit 5 sends information that represents whether or not the next entry to be input into the instruction buffer 3 exists to the cache controlling unit 4. The cache controlling unit 4 controls data output from the cache data unit 1 based on the information.

When a cache miss takes place, the cache controlling unit 4 stores an identification (ID) of a miss instruction and compares the ID thereof with an ID of an instruction received from an external storing unit. When these IDs match, the cache controlling unit 4 stores the move-in data at a relevant entry position in the cache data unit 1. In addition, the cache controlling unit 4 informs this situation in which the move-in data is hit to the instruction buffer controlling unit 5.

Thus, the instruction buffer controlling unit 5 stores the move-in data to the relevant entry position in the instruction buffer 3. Consequently, the move-in data is stored in the cache data unit 1. In addition, the move-in data is stored in the instruction buffer 3 through the cache data unit 1 and output to the instruction executing unit.

In the conventional instruction supplying apparatus, when the instruction executing unit does not issue an instruction release signal, instructions read from the cache data unit 1 are queued in the instruction buffer 3. When the instruction executing unit issues the instruction release signal, the instructions are successively read from the instruction buffer 3 and sent to the instruction executing unit.

FIG. 1B is a timing chart showing the instruction supplying process. In FIG. 1B, the instruction buffer 3 has two stages 0 and 1.

When the instruction executing unit issues an instruction supply request, in cycle T1 of FIG. 1B, a cache access address is sent to the cache data unit 1 and the cache tag unit 2.

Thereafter, in cycle T2, the cache data unit 1 and the cache tag unit 2 are accessed. Thus, it is determined whether or not instructions read from the cache data unit 1 accord with required instructions. The instructions read from the cache data unit 1 are sent to the instruction buffer 3.

When instructions are sent from the cache data unit 1 to the instruction buffer 3 in cycle T2 and the instruction executing unit issues the instruction release signal, the instructions are read from the instruction buffer 3 and sent to the instruction executing unit in cycle T3. When the instruction release signal is not issued, the instructions are stored in the stages 0 and 1 of the instruction buffer 3 as represented after cycle T6. When the instruction release signal is issued again, the instructions queued are successively read and sent to the instruction executing unit as represented after cycle T8.

In the conventional instruction supplying apparatus, the cache data unit 1 and the instruction buffer 3 individually store instructions.

However, recently, so as to increase the data processing speed, a cache unit that is different from the conventional external cache unit is disposed in the same CPU chip.

In other words, as shown in FIG. 1C, along with a conventional cache unit (secondary cache unit) 6B disposed between a CPU chip 6C and a main storing unit 6A, new cache units 7A and 7B that function as primary cache units are disposed in the same CPU chip 6C.

When the primary cache units 7A and 7B are used, the primary instruction cache unit 7B which stores the instructions and an instruction buffer unit 7C that stores instructions that are read from the primary instruction cache unit 7B, are disposed in the same chip. The primary instruction cache unit 7B comprises the cache data unit 1, the cache tag unit 2, and the cache controlling unit 4 shown in FIG. 1A. The instruction buffer unit 7C includes the instruction buffer 3 and the instruction buffer controlling unit 5. The instruction pipeline 7D accords with the instruction executing unit. Thus, the cache data unit 1 and the instruction buffer 3 redundantly store instructions. Consequently, the resources are wastefully used.

Particularly, in a computer system using instructions of long length, the instruction buffer 3 requires a large storage capacity. Thus, this problem is significant.

However, in the conventional instruction supplying apparatus, signals should be complicatedly exchanged between the cache controlling unit 4 and the instruction buffer controlling unit 5 so as to perform the instruction buffer control and move-in control.

Normally, the primary instruction cache unit 7B and the instruction buffer unit 7C are designed by different designers. Thus, when the signals exchanged between these units are complicated, this adversely affect the designs of the units, thereby increasing the designing time.

In FIG. 1C, when a data buffer unit that stores data for calculations required by the instruction pipeline 7D is disposed between the primary data cache unit 7A and the instruction pipeline 7D, the same problem as described above with the instruction buffer unit 7C and the primary instruction cache unit 7B takes place.

SUMMARY OF THE INVENTION

The present invention is made from the above-described point of view. An object of the present invention is to provide a data supplying apparatus with a simple structure and method for supplying instructions or data.

The present invention is applied for a memory unit having a data memory that stores data and a tag memory that stores first address information corresponding to the data. The memory unit is adapted for outputting data stored in the data memory corresponding to a data request.

The data stored by the data memory is, for example, instructions and calculation data required by a data requesting unit, such as the instruction executing unit or a cache located between the memory unit and the instruction executing unit. In the data memory, both instructions and calculation data may be stored. The memory unit is, for example, a data cache that supplies instruction codes to the instruction executing unit or a data cache that supplies operands to the instruction executing unit.

A data supplying apparatus according to the present invention has an address buffer unit and an access unit. The address buffer unit is adapted for storing information that is received corresponding to second address information included in a data request and that is used to access the data memory. The access unit is adapted for accessing the data memory with the information stored in the address buffer unit independently from the tag memory with the second address information.

The address buffer unit has at least one stage. When the data requesting unit does not issue a data release signal, the address buffer unit successively buffers information used to access the data memory in the input order. When the data requesting unit issues the data release signal, the address buffer unit outputs the stored information in the input order.

Normally, the data amount of access information is smaller than the data amount of the data stored in the data memory, when the address buffer unit that stores the access information is disposed instead of the instruction buffer that stores the data, the hardware resource necessary for supplying data to the instruction executing unit can be reduced.

In addition, the address buffer unit can be disposed in the cache unit or the tag memory. Thus, the conventional instruction buffer and instruction buffer controlling unit can be omitted. Consequently, the design and the fabrication of the cache unit can be advantageously simplified.

Moreover, the address buffer unit stores, for example, valid information that represents whether or not data in the data memory is valid in correlation with the information used to access the data memory. The valid information is sent to a data requesting unit in synchronization with the output of the relevant data.

The access unit includes a selecting circuit that selects one of, for example, information stored in the address buffer unit and access information received externally. When the address buffer unit is not empty, the selecting unit selects the information stored in the buffer unit and sends the selected information to the data memory.

Unlike with the conventional cache unit, the data memory can be accessed independently from the tag memory. Thus, while new access information is being input to the address buffer unit, the access information that has been stored is read. The relevant data is output from the data memory in the input order of the data requests.

These and other objects, features and advantages of the present invention will become more apparent in light of the following detailed description of best mode embodiments thereof, as illustrated in the accompanying drawings.

BRIEF DESCRIPTION OF THE DRAWINGS

FIG. 4C is a schematic diagram showing the relation between a valid controlling circuit and a valid buffer;

FIG. 6A is a timing chart showing an operation of the set associative system;

FIG. 8B is a schematic diagram showing data stored in an address buffer of the first embodiment of the full associative memory system;

DESCRIPTION OF THE PREFERRED EMBODIMENTS

Next, with reference to the accompanying drawings, an embodiment of the present invention will be described in detail.

Figure 2A:
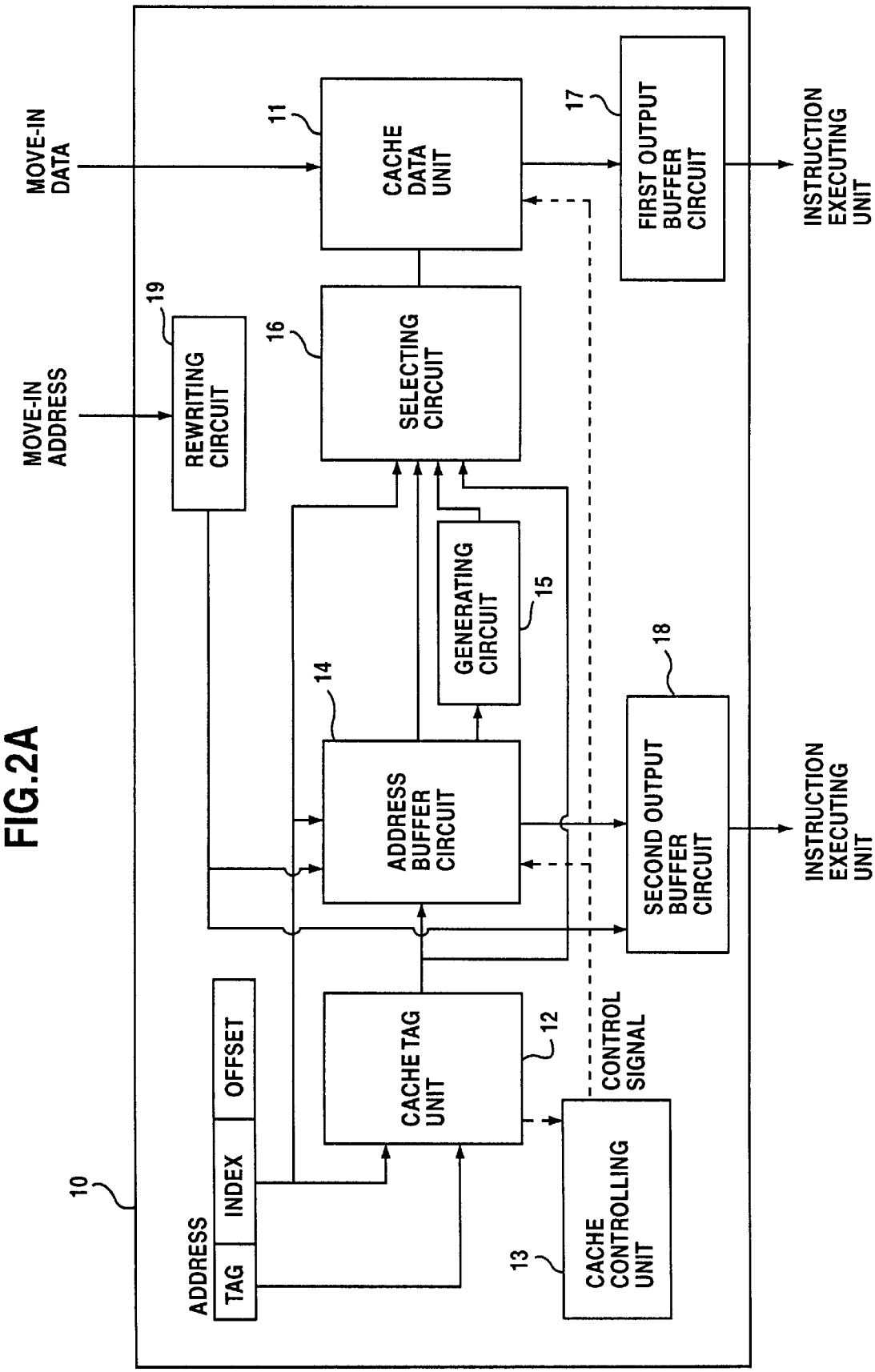
FIG. 2A is a block diagram showing a theoretical structure of a data supplying apparatus according to the present invention.

FIG. 2A is a block diagram showing a theoretical structure of a data supplying apparatus according to the present invention.

In FIG. 2A, reference numeral 10 is a data supplying apparatus according to the present invention. The data supplying apparatus 10 comprises a cache data unit 11, a cache tag unit 12, and a cache controlling unit 13. The cache data unit 11 stores instructions and data. The cache tag unit 12 stores tag data (in an associative memory structure, the cache tag unit 12 stores directory data). The cache controlling unit 13 controls the entire apparatus. The data supplying apparatus 10 supplies instructions and data to an external instruction executing unit. When instructions are supplied, the data supplying apparatus 10 is referred to as an instruction supplying apparatus. In the following description, instructions and data are simply referred to as data.

When the cache data unit 11 and the cache tag unit 12 have a direct mapping structure, the cache tag unit 12 outputs valid information to the cache data unit 11. In this case, the valid information represents hit/miss of data. When the cache data unit 11 and the cache tag unit 12 have a set associative structure, the cache tag unit 12 outputs data destination way information that represents data destination way and hit/miss of data to the cache data unit 11. When the cache data unit 11 and the cache tag unit 12 have an associative memory structure, the cache tag unit 12 outputs access information that represents data destination entry with a hit/miss signal to the cache data unit 11.

The cache controlling unit 13 receives the hit/miss signal from the cache tag unit 12 and outputs a signal for controlling the cache data unit 11 and the address buffer circuit 14 corresponding to the hit/miss signal. The data supplying apparatus 10 further comprises an address buffer circuit 14, a generating circuit 15, a selecting circuit 16, a first output buffer circuit 17, a second output buffer circuit 18, and a rewriting circuit 19.

In this case, the cache controlling unit 13 controls the generating circuit 15, the selecting circuit 16, the first output buffer circuit 17, the second output buffer circuit 18, and the rewriting circuit 19.

When the cache data unit 11 and the cache tag unit 12 have the direct mapping structure, the address buffer circuit 14 stores a pair of the address information (index information) designated with a data request for the cache data unit 11 and valid information that represents a hit/miss indication and that is received from the cache tag unit 12 corresponding to the address information. The address information and the valid information are stored in an FIFO (first-in first-out) format. The valid information represents whether relevant data is valid or invalid.

On the other hand, when the cache data unit 11 and the cache tag unit 12 have the set associative structure, the address buffer circuit 14 stores a set of address information (index information) designated with a data request for the cache data unit 11, way information that is received from the cache tag unit 12 corresponding to the address information, and the valid information that represents hit/miss indication corresponding to the way information in the FIFO format.

When the cache data unit 11 and the cache tag unit have the associative memory structure, the address buffer circuit 14 stores a pair of access information that is received from the cache tag unit 12 corresponding to a data request and valid information that represents whether or not the access information represents hit/miss of all entries in the FIFO format. Alternatively, the address buffer circuit 14 stores a pair of issuance sequence numbers of a hit signal of access information and valid information that represents hit/miss indication corresponding to the issuance sequence numbers for individual entries of the cache tag unit 12. The issuance sequence numbers of the hit signal represent hit order number or ID information.

When the address buffer circuit 14 stores issuance sequence numbers of the hit signal, the generating circuit 15 generates access information in the order of the issuance sequence numbers in such a manner that an entry that has an issuance sequence number represents a hit signal.

When the cache data unit 11 and the cache tag unit 12 have the direct mapping structure, the selecting circuit 16 selects address information stored in the address buffer circuit 14 and sends the selected address information to the cache data unit 11. Alternatively, the selecting circuit 16 selects address information to be stored in the address buffer circuit 14 and sends the selected address information to the cache data unit 11, bypassing the address buffer circuit 14.

On the other hand, when the cache data unit 11 and the cache tag unit 12 has the set associative structure, the selecting circuit 16 selects address information and way information stored in the address buffer circuit 14 and sends the selected address information and way information to the cache data unit 11. Alternatively, the selecting circuit 16 selects address information and way information to be stored in the address buffer circuit 14 and sends the selected address information and way information to the cache data unit 11, bypassing the address buffer circuit 14.

When the cache data unit 11 and the cache tag unit 12 have the associative memory structure and the address buffer circuit 14 stores access information, the selecting circuit 16 selects access information stored in the address buffer circuit 14 and sends the selected access information to the cache data unit 11. Alternatively, the selecting circuit 16 selects access information to be stored in the address buffer circuit 14 and sends the selected access information to the cache data unit 11, bypassing the address buffer circuit 14. When the address buffer circuit 14 stores issuance sequence numbers, the selecting circuit 16 selects access information generated by the generating circuit 15 and sends the selected access information to the cache data unit 11. Alternatively, the selecting circuit 16 selects access information to be stored in the address buffer circuit 14 and sends the selected access information to the cache data unit 11, bypassing the address buffer circuit 14.

When the first output buffer circuit 17 is composed of a buffer with a single stage and the selecting circuit 16 sends address information (access information) to the cache data unit 11, the first output buffer circuit 17 receives data from the cache data unit 11 and sends the received data to the instruction executing unit.

When data is sent to the instruction executing unit, the second output buffer circuit 18 reads valid information paired with the data stored in the address buffer circuit 14 and sends the valid information to the instruction executing unit.

When a move-in is executed for a memory region of the cache data unit 11 represented by information stored in the address buffer circuit 14, the rewriting circuit 19 rewrites valid information paired with information stored in the address buffer circuit 14.

In the direct mapping structure, when a data request is issued by the instruction executing unit, the address buffer circuit 14 stores address information used to read data designated with the data request in the FIFO format.

When the instruction executing unit issues a data release signal and the address buffer circuit 14 has stored address information, the selecting circuit 16 reads the address information and sends it to the cache data unit 11. Thus, the data is read from the cache data unit 11 and sent to the instruction executing unit. When the address buffer circuit 14 has not stored address information, the selecting circuit 16 selects address information to be stored in the address buffer circuit 14 and sends the selected address information to the cache data unit 11, bypassing the address buffer circuit 14. Thus, the data is read from the cache data unit 11 and sent to the instruction executing unit.

When the first output buffer circuit 17 is empty, since the first output buffer circuit 17 can store data, even if the instruction executing unit has not issued a data release signal, the selecting circuit 16 selects address information to be stored in the address buffer circuit 14 and sends the selected address information to the cache data unit 11, bypassing the address buffer circuit 14. Thus, data is stored in the first output buffer circuit 17.

Figure 2B:
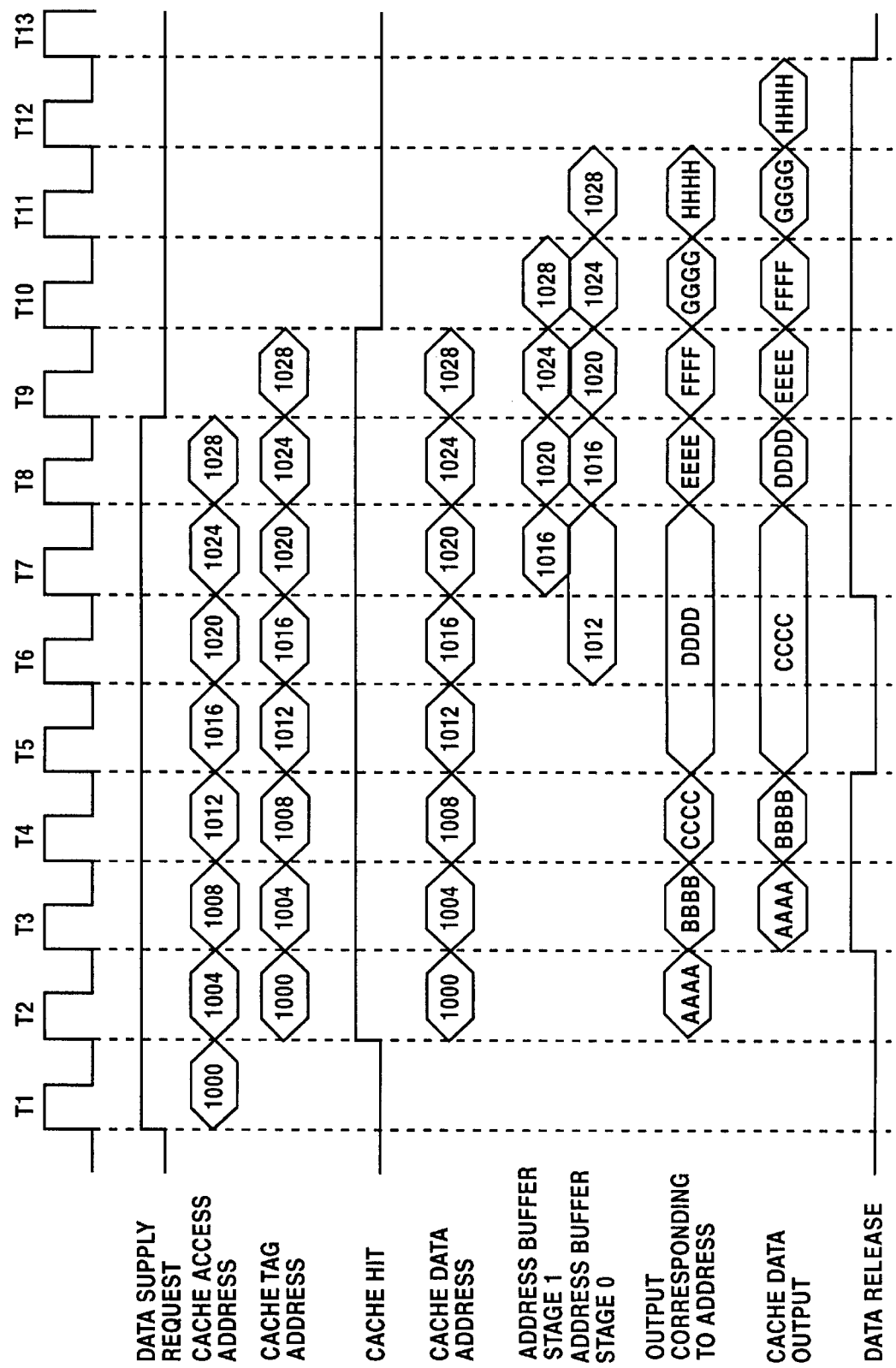
FIG. 2B is a timing chart showing an operation of the instruction supplying apparatus according to the present invention.

FIG. 2B is a timing chart showing a data supplying operation according to the present invention. In FIG. 2B, the address buffer circuit 14 has two stages 0 and 1. When the instruction executing unit issues a data supply request, in cycle T1 shown in FIG. 2B, a cache access address is supplied from the instruction executing unit to the cache tag unit 12 and the address buffer circuit 14.

In the next cycle T2, the cache tag unit 12 is accessed so as to determine whether or not data stored in the cache data unit 11 accords with required data. When the address buffer circuit 14 is empty, the cache access address is sent to the cache data unit 11, bypassing the address buffer circuit 14, according to the operation of the selecting circuit 16. Thus, data is read from the cache data unit 11 and stored in the first output buffer circuit 17. On the other hand, when the address buffer circuit 14 is not empty, address information or access information stored in the address buffer circuit 14 is sent to the cache data unit 11 according to the operation of the selecting circuit 16 and the cache access address is stored in the address buffer circuit 14. The cache access address is stored in the address buffer circuit 14 when the first output buffer circuit 17 has data and the data release signal is not issued, or when the first output buffer circuit 17 has data and an address is present at a head position of the address buffer circuit 14. When the instruction executing unit has issued the data release signal, data is always stored in the first output buffer circuit 17.

In the case that data is sent from the cache data unit 11 to the first output buffer circuit 17, when the instruction executing unit has issued the data release signal, in cycle T3, data is read from the first output buffer circuit 17 and sent to the instruction executing unit. On the other hand, when the instruction executing unit has not issued the data release signal, in cycles T5 and T6, while data is stored in the first output buffer 17, cache access addresses are queued in the stages 0 and 1 of the address buffer circuit 14. Thereafter, when the instruction executing unit issues the data release signal, as represented after cycle T7, the cache access addresses are successively read from the stage 0 and sent to the cache data unit 11 corresponding to the operation of the selecting circuit 16. Instructions are read from the cache data unit 11 and sent to the instruction executing unit.

The data supplying apparatus 10 according to the present invention has the address buffer circuit 14 that stores information used to access the cache data unit 11. The information is buffered so that the cache data unit 11 and the cache tag unit 12 are independently operated. Thus, the conventional instruction buffer and instruction buffer controlling unit can be omitted. Consequently, data can be supplied to the instruction executing unit from a structure in which buffer resources are reduced.

For example, in the case of a CPU that fetches a plurality of instructions at the same time as in a super scalar calculation, one entry of a conventional instruction buffer requires an area for storing a plurality of the instructions required. In a CPU that simultaneously fetches four instructions each having 32 bits, one entry of an instruction buffer has 128 bits.

On the other hand, the address buffer circuit 14 according to the present invention is required to store only the top address of such an instruction. For example, when instructions are fetched, an address with only 32 bits is stored.

In the case of a CPU that processes an instruction with a variable length, as in a CISC (complex instruction set computer), one entry of a conventional instruction buffer requires a length corresponding to the length of the instruction. However, the address buffer circuit 14 according to the present invention needs only store an address, whose length is shorter than the length of an instruction. Thus, the size of the address buffer circuit becomes smaller than the size of the instruction buffer. For example, when the length of an instruction is 50 bits, the address buffer circuit is only required to store an address with 32 bits.

Thus, when address information is buffered instead of data, the resources for supplying data to the instruction executing unit can be reduced.

In addition, it is not necessary to dispose a buffer unit between the primary cache unit and the instruction pipeline. Thus, the cache controlling unit 13 does not need to exchange control signals with the buffer unit, unlike with the conventional structure. In reality, all processes for a data supply request, the result of cache hit/miss-hit, the identification of the move-in data, and so forth can be performed in the cache unit. Thus, the design and fabrication of the cache unit can be simplified.

Moreover, when the address buffer circuit 14 is disposed in the cache unit, data can be supplied at high speed. For example, the physical length of a large instruction buffer is as much as 3 mm. In this case, the long wiring required occasionally causes a signal that flows therein to be delayed for 1 nsec.

However, when the instruction buffer is removed and the address buffer circuit 14 is disposed in the cache unit, since the wiring length is decreased, the delay of a control signal and so forth is reduced. Thus, the speed of the operation of the address buffer circuit 14 is increased. One cycle of a clock signal at 100 MHz is equivalent to 10 nsec. When a delay of 1 nsec is removed, the speed of the clock signal can be increased by 10%.

Next, embodiments corresponding to the direct mapping method, the set associative method, and the associative memory method will be described.

Figure 3:
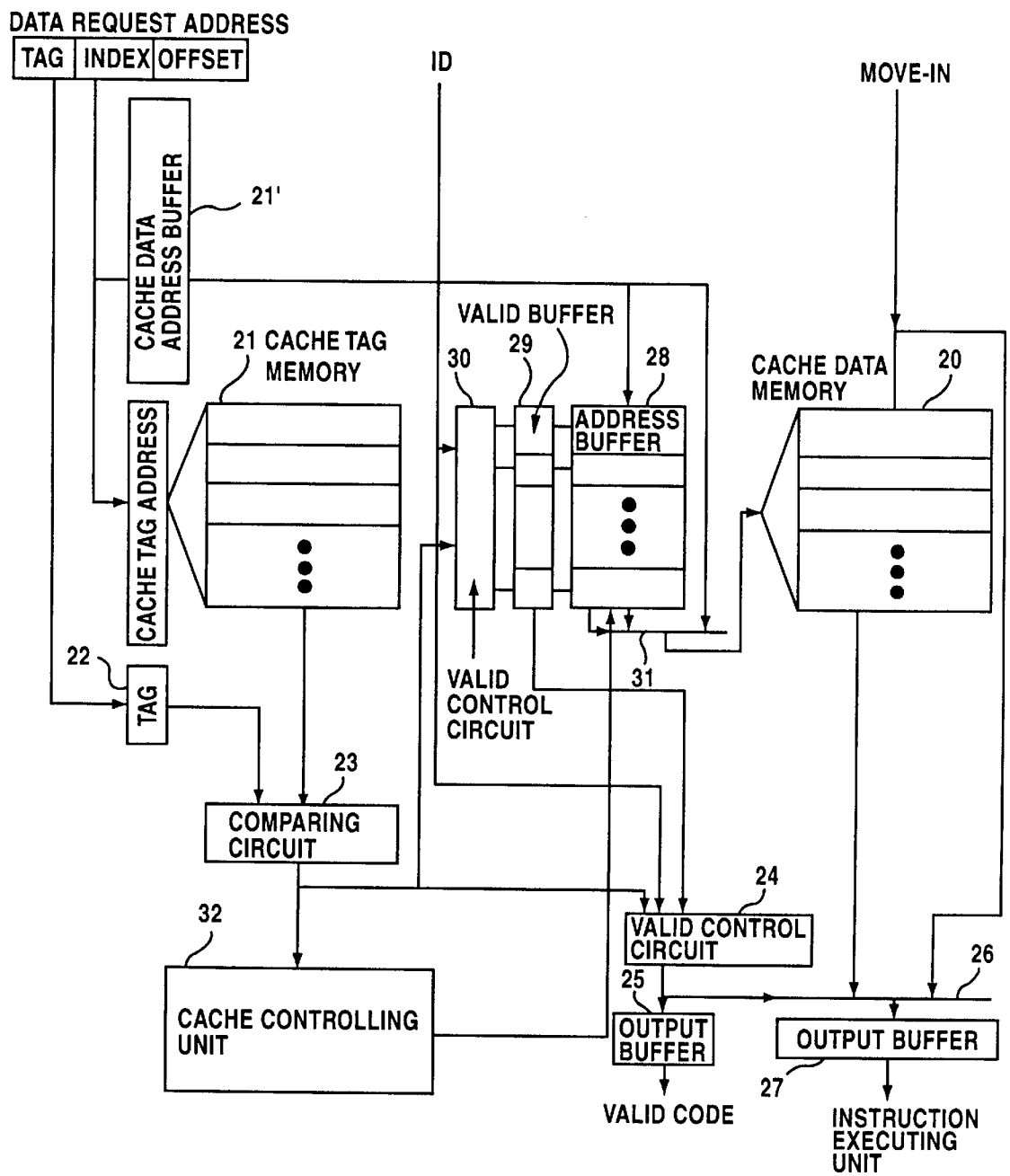
FIG. 3 is a block diagram showing a direct mapping system according to an embodiment of the present invention.

FIG. 3 is a block diagram showing a structure of a direct mapping type cache unit according to an embodiment of the present invention.

In FIG. 3, reference numeral 20 is a cache data memory that stores data. Reference numeral 21 is a cache tag memory that stores a tag. Reference numeral 21' is a cache data address buffer that stores an index included in a data request address as a cache data address. Reference numeral 22 is a tag buffer that stores a tag included in the data request address. Reference numeral 23 is a comparing circuit that determines whether or not a tag read from the cache tag memory 21 accords with a tag stored in the tag buffer 22. Reference numeral 24 is a valid controlling circuit that controls valid information of data to be sent to the instruction executing unit. Reference numeral 25 is an output buffer that stores valid information sent to the instruction executing unit.

Reference numeral 26 is a selecting circuit that selects one of data read from the cache data memory 20 and move-in data corresponding to a selection control signal that is valid information of data sent to the instruction executing unit, and sends the selected data to the instruction executing unit. Reference numeral 27 is an output buffer that stores data to be sent to the instruction executing unit. Reference numeral 28 is an address buffer that stores an index included in the data request address in the FIFO format. Reference numeral 29 is a valid buffer that stores valid information of data represented as an index stored in the address buffer 28.

Reference numeral 30 is a valid controlling circuit that controls the valid information stored in the valid buffer 29. Reference numeral 31 is a selecting circuit that selects an index stored in the address buffer 28 and sends the selected index to the cache data memory 20. Alternatively, the selecting circuit 31 selects an index stored in the cache data address buffer 21' and sends the selected index to the cache data memory 20, bypassing the address buffer 28. Reference numeral 32 is a cache controlling unit that controls the entire processes of the cache unit. ID is identification information that represents a miss-hit of move-in instruction data.

In the cache unit according to the embodiment shown in FIG. 3, when the instruction executing unit issues a pre-fetch request with a data request address, the address buffer 28 stores an index included in the data request address in the FIFO format. In addition, the valid controlling circuit 30 receives valid information that represents hit/miss-hit indication and that is received from the comparing circuit 23 corresponding to the data request address and writes the valid information to the valid buffer 29.

The index included in the data request address is stored in the address buffer 28 in the FIFO format. In addition, the valid information of the data represented with the index stored in the address buffer 28 is stored in the valid buffer 29. When the instruction executing unit issues the data release signal and the address buffer 28 stores an index, the selecting circuit 31 selects the index and sends the selected index to the cache data memory 20. When the address buffer 28 does not store an index, the selecting circuit 31 selects an index included in the data request address and sends the selected index to the cache data memory 20, bypassing the address buffer 28.

When the cache data memory 20 receives the index from the selecting circuit 31, the cache data memory 20 reads data represented by the index and sends the data to the instruction executing unit through the output buffer 27. When the selecting circuit 31 selects an index stored in the address buffer 28, the valid controlling circuit 24 reads the valid information corresponding to the index to be stored in the valid buffer 29 and sends the valid information to the instruction executing unit through the output buffer 25. When the selecting circuit 31 selects an index included in the data request address, the valid controlling circuit 24 receives the valid information from the comparing circuit 23 and sends the valid information to the instruction executing unit through the output buffer 25.

In this operation, when the address buffer 28 is empty, the selecting circuit 31 selects an index stored in the cache data address buffer 21' regardless whether or not the data release signal has been issued, and sends the selected index to the cache data memory 20, bypassing the address buffer 28.

In other words, in the conditions that an index of a data request address is generated and the address buffer 28 is empty, data stored in the output buffer 27 is sent to the instruction executing unit, the cache data memory 20 is accessed, bypassing the address buffer 28, and the obtained data is stored in the output buffer 27. In the condition that the address buffer 28 is not empty, data stored in the output buffer 27 is sent to the instruction executing unit, the cache data memory 20 is accessed with an index read from the address buffer 28 and the obtained data is stored in the output buffer 27. In addition, the index that is newly generated is stored in the address buffer 28.

The address buffer 28 is composed of, for example, a FIFO circuit. An index is written to the last position of an index sequence of the FIFO circuit. An index is read successively from the top position of the index sequence of the FIFO circuit.

Figure 4A:
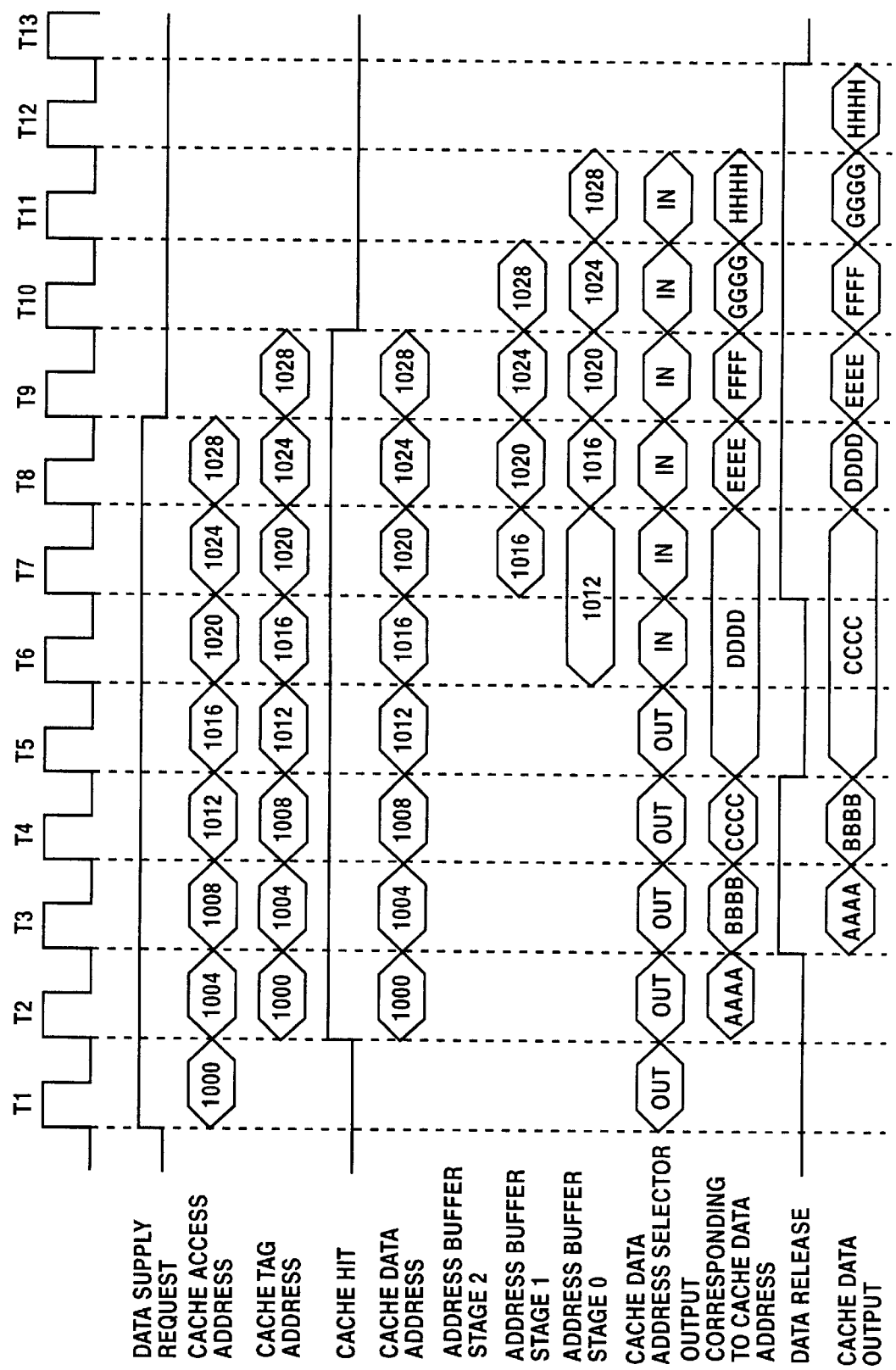
FIG. 4A is a timing chart showing an operation of the direct mapping system according to the embodiment of the present invention.

FIG. 4A is a timing chart showing the data supplying operation corresponding to the embodiment shown in FIG. 3. It is assumed that the address buffer 28 has three stages 0, 1, and 2. Data AAAA, BBBB, . . . , and HHHH are stored at addresses 1000, 1004, . . . , and 1028 of the cache data memory 20, respectively.

The cache access address represents an index included in a data request address. When the cache access address is stored in the cache data address buffer 21', the cache access address is treated as a cache data address. When the cache access address is input to the cache tag memory 21, the cache access address is treated as a cache tag address.

In the conditions that the output buffer 27 stores data and that the data release signal has not been issued or an index is present at the top position (stage 0) of the address buffer 28, an index is written to the address buffer 28.

Cache data address selector OUT/IN represents a control signal that is input from the address buffer 28 to the selecting circuit 31. When the cache data address selector is OUT, the output of the cache data address buffer 21' is selected. When the cache data address selector is IN, the output of the address buffer 28 is selected. When the address buffer 28 is empty, the signal OUT is sent to the selecting circuit 31. When the address buffer 28 is not empty, the signal IN is sent to the selecting circuit 31.

In cycles T1 to T5, the control signal is OUT. Thus, the selecting circuit 31 selects an external bypass of the address buffer 28. After cycle T6, since the control signal is IN, the output of the address buffer 28 is selected.

Corresponding to the address selected by the selecting circuit 31, relevant data is output from the cache data memory 20. Thereafter, cache data output is supplied from the output buffer 27.

When a cache access request (data access request) with a cache access address 1000 is received in cycle T1, the cache tag memory 21 is accessed in cycle T2. In addition, a cache data address is sent to the address buffer 28. At this point, since the address buffer 28 is empty, the received cache data address is sent to the cache data memory 20, bypassing the address buffer 28. Thus, the relevant data AAAA is output from the cache data memory 20 and is written to the output buffer 27. In cycle T3, in synchronization with the issuance of the data release signal, the data AAAA is sent to the instruction executing unit.

When the stop of the data release signal is detected in cycle T5, the data CCCC is stored in the output buffer 27. In addition, the data storing process is performed for the address buffer 28. At this point, the address 1012 corresponding to the data DDDD is supplied to the cache data memory 20. Thereafter, in cycle T6, the address 1016 of the cache tag memory 21 is accessed so as to perform the hit/miss-hit determination. In addition, the address 1012 is again stored in the stage 0 of the address buffer 28. Since the data release signal is not issued in cycle T6, the address 1012 is stored in the stage 0 of the address buffer 28 in the cycle T7. The next address 1016 is stored in the stage 1 of the address buffer 28. In cycle T7, when the issuance of the data release signal is detected, the address buffer 28 starts the FIFO operation and successively reads cache data addresses from the address buffer 28. Thus, data is read from the cache data memory 20 and sent to the instruction executing unit.

Figure 4B:
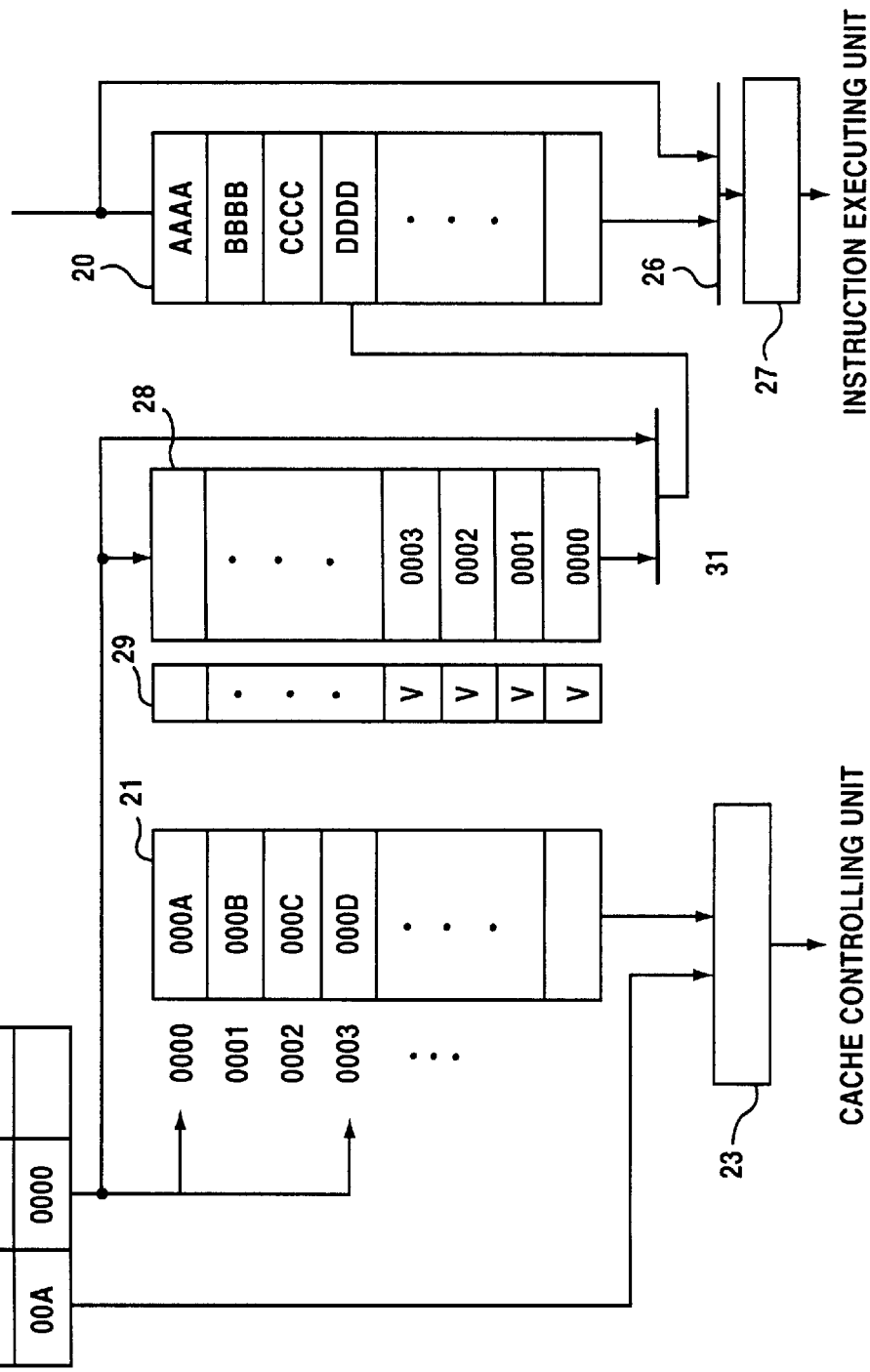
FIG. 4B is a schematic diagram showing data stored in an address buffer of the direct mapping system according to the embodiment of the present invention.

FIG. 4B is a schematic diagram showing data stored in the data supplying apparatus shown in FIG. 3. In FIG. 4B, tags 00A, 00B, 00C, 00D, . . . and so forth are stored at addresses 0000, 0001, 0002, 0003, . . . and so forth of the cache tag memory 21, respectively. Data AAAA, BBBB, CCCC, DDDD, . . . , and so forth are stored in the relevant addresses of the cache data memory 20.

In the case that at least one index is stored in the address buffer 28, as represented by an upper left portion of FIG. 4B, when data request addresses with indexes 0000, 0001, 0002, and 0003 are successively supplied, these indexes are successively input and stored to the address buffer 28. At this point, the result of the hit determination performed by the comparing circuit 23 is stored as a valid bit in the valid buffer 29. The valid bit is denoted by V and represents that a tag included in a data request address has been hit.

These indexes are read from the address buffer 28 by the selecting circuit 31 and sent to the cache data memory 20. Thus, the data AAAA, BBBB, CCCC, and DDDD are successively sent to the output buffer 27.

Next, the operations of the valid controlling circuits 24 and 30 will be described in detail. These circuits receive the result of the hit determination performed by the comparing circuit 23 from the cache controlling unit 32 so as to control the valid information stored in the valid buffer 29 and the output buffer 25. In addition, the valid controlling circuits 24 and 30 function as the rewriting circuit 19 shown in FIG. 2A.

FIG. 4C is a block diagram showing the relation between the valid control circuit 30 and the valid buffer 29. When a tag included in a data request address hits the cache tag memory 21 and a cache data address is input to the address buffer 28 corresponding to the tag, the valid controlling circuit 30 enables a valid bit (valid information) of the valid buffer 29 corresponding to the entry.

When the tag misses the cache tag memory 21, an ID generating unit 33 in the cache controlling unit 32 generates a relevant ID and sends the generated ID to an external storing unit such as a main memory or a secondary cache. In addition, this ID is also sent to the valid controlling circuit 30. The valid controlling circuit 30 adds the ID as ID information to relevant valid information in the valid buffer 29 so that the valid information represents an ID waiting state.

When required data is moved in from the external storing unit, the ID of the data (move-in ID) is compared with the ID information stored in the valid buffer 29. When they match, the valid information is rewritten to a valid state from the ID waiting state. At this point, the cache controlling unit 32 rewrites relevant data stored in the cache data memory 20 to move-in data and rewrites relevant tag data in the cache tag memory 21 to tag data corresponding to the move-in data.

The move-in data is read from the cache data memory 20 with the enabled cache data address stored in the address buffer 28. When an entry of the address buffer 28 becomes empty, the valid controlling circuit 30 disables the valid information.

In the case that the address buffer 28 is empty, when the result of the hit determination is true, the valid controlling circuit 24 enables the valid code (valid information) stored in the output buffer 25. When the result of the hit determination is false, the valid controlling circuit 24 disables the valid code.

When the address buffer 28 is not empty and the valid bit of the valid buffer 29 corresponding to the top entry is enabled, the valid code stored in the output buffer 25 is enabled. In addition, the selecting circuit is controlled so as to select data received from the cache data memory 20.

When the valid bit corresponding to the top entry represents the ID waiting state, the move-in ID received from the external storing unit is compared with the ID information at the top position of the valid buffer 29. When they match, the valid code stored in the output buffer 25 is enabled. In addition, the selecting circuit 26 is controlled so as to select the move-in data. When they do not match, the valid code stored in the output buffer 25 is disabled.

Thus, the requested data is sent to the instruction executing unit through the output buffer 27. In addition, the relevant valid information is output from the output buffer 25. The instruction executing unit performs a relevant process corresponding to data with an enabled valid code received from the data supplying apparatus.

Thus, in the direct mapping type cache unit according to the embodiment shown in FIG. 3, data that is stored in the cache data memory 20 can be supplied to the instruction executing unit, not buffered.

Figure 5:
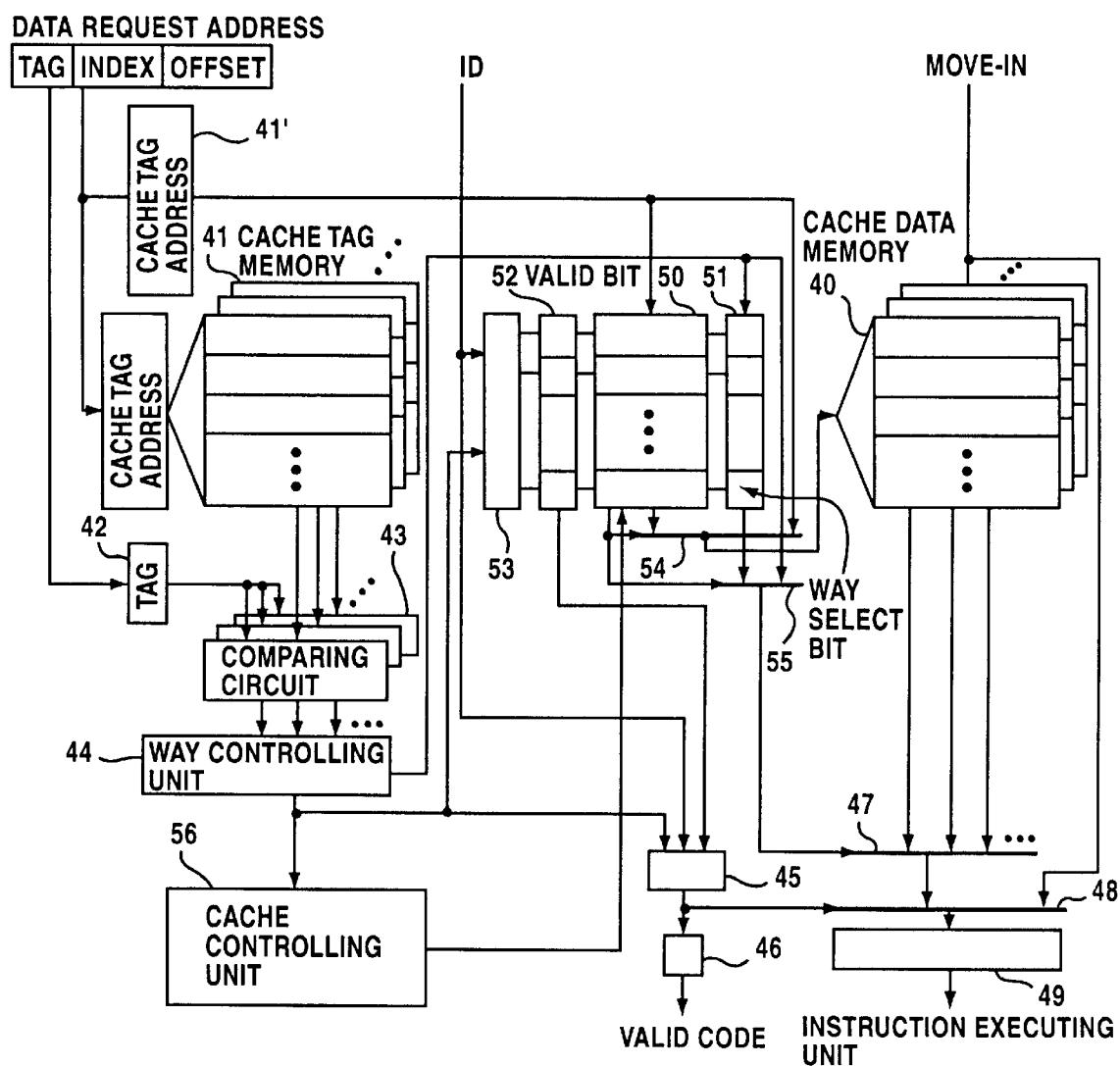
FIG. 5 is a schematic diagram showing a set associative system according to the embodiment of the present invention.

FIG. 5 is a block diagram showing a structure of a set associative type cache unit according to an embodiment of the present invention.

In FIG. 5, reference numeral 40 is a cache data memory that stores data corresponding to a way structure. Reference numeral 41 is a cache tag memory that stores a tag corresponding to the way structure. Reference numeral 41' is a cache data address buffer that stores an index included in a data request address as a cache data address. Reference numeral 42 is a tag buffer that stores a tag included in a data request address. Reference numeral 43 is a comparing circuit that is composed of a comparator corresponding to the way structure. The comparing circuit 43 determines whether or not a tag read from the cache tag memory 41 accords with a tag stored in the tag buffer 42 corresponding to the way. Reference numeral 44 is a way controlling circuit that controls way information required by the cache data memory 40.

Reference numeral 45 is a valid controlling circuit that controls valid information of data that is sent to the instruction executing unit. Reference numeral 46 is an output buffer that stores valid information of data that is sent to the instruction executing unit. Reference numeral 47 is a first selecting circuit that selects data represented with a hit way from data corresponding to the way read from the cache data memory 40 and outputs the selected data. Reference numeral 48 is a second selecting circuit that selects one of data received from the first selecting circuit 47 and the move-in data corresponding to a selection control signal that is valid information of data sent to the instruction executing unit, and outputs the selected data to the instruction executing unit.

Reference numeral 49 is an output buffer that stores data that is sent to the instruction executing unit. Reference numeral 50 is an address buffer that stores an index included in a data request address in the FIFO format. Reference numeral 51 is a way buffer that stores hit destination way information (way select bit) corresponding to an index stored in the address buffer 50. Reference numeral 52 is a valid buffer that stores valid information of data represented with an index stored in the address buffer 50. The valid information stored in the valid buffer 52 represents a validity in the case that one of ways is hit. In addition, the valid information represents an invalidity in the case that no way is hit.

Reference numeral 53 is a valid controlling circuit that controls valid information stored in the valid buffer 52. Reference numeral 54 is an index selecting circuit that selects an index stored in the address buffer 50 and sends the selected index to the cache data memory 50. Alternatively, the index selecting circuit 54 selects an index included in a data request address and sends the selected index to the cache data memory 40, bypassing the address buffer 50. Reference numeral 55 is a way selecting circuit that selects way information stored in the way buffer 51 and sends the selected way information to the cache data memory 40. Alternatively, the way selecting circuit 55 selects way information received from the way controlling circuit 44 (the way information is received from the comparing circuit 43) and sends the selected way information to the cache data memory 40, bypassing the way buffer 51. Reference numeral 56 is a cache controlling unit that controls the entire cache unit. ID is identification information that represents a miss of instruction data that is moved in. The valid controlling circuits 45 and 53 shown in FIG. 5 function as the rewriting circuit 19, as with the valid controlling circuits 24 and 30 shown in FIG. 3.

In the cache unit according to the embodiment shown in FIG. 5, when the instruction executing unit issues a pre-fetch request with a data request address, the address buffer 50 stores an index included in a data request address in the FIFO format. The way controlling circuit 44 receives hit destination way information from the comparing circuit 43 corresponding to the data request address and writes the hit destination way information to the way buffer 51. The valid controlling circuit 53 generates information. The information represents a validity in the case that a way is hit. The information represents an invalidity in the case that no way is hit corresponding to the output of the way controlling circuit 44, and writes the information to the valid buffer 52.

In such a manner, an index included in a data request address is stored in the address buffer 50 in the FIFO format. In addition, hit destination way information of data represented by an index stored in the address buffer 50 is stored in the way buffer 51. Valid information of data represented with an index stored in the address buffer 50 is stored in the valid buffer 52. In the case that the instruction executing unit issues the data release signal, when the address buffer 50 stores an index, the index selecting circuit 54 reads the index and sends the selected index to the cache data memory 40. When the address buffer does not store an index, the index selecting circuit 54 selects an index included in a data request address and sends the selected index to the cache data memory 40, bypassing the address buffer 50.

On the other hand, when an index stored in the address buffer 50 is sent to the cache data memory 40 in synchronization with the operation of the index selecting circuit 54, the way selecting circuit 55 reads way information paired with the index from the way buffer 51 and sends the way information to the first selecting circuit 47. When an index included in a data request address is sent to the cache data memory 40, the way selecting circuit 55 selects way information received from the way controlling circuit 44 and sends the selected way information to the first selecting circuit 47.

The cache data memory 40 receives an index from the index selecting circuit 54 and outputs data corresponding to the index. In addition, the first selecting circuit 47 receives way information from the way selecting circuit 55, selects hit destination data represented with way information received from the way selecting circuit 55 from data corresponding to the way, and sends the selected data to the instruction executing unit through the second selecting circuit 48 and the output buffer 49.

In this case, when the index selecting circuit 54 selects an index of the address buffer 50, the valid controlling circuit 45 reads valid information corresponding to the index from the valid buffer 52 and sends the valid information to the instruction executing unit through the output buffer 46. When the index selecting circuit 54 selects an index included in a data request address, the valid controlling circuit 45 generates valid information that represents a validity in the case that a way is hit and an invalidity in the case that no way is hit corresponding to the output of the way controlling circuit 44, and sends the valid information to the instruction executing unit through the output buffer 46.

In this operation, when the address buffer 50 is empty, the index selecting circuit 54 selects an index stored in the cache data address buffer 41' regardless of whether or not the instruction release signal has been issued, and sends the selected index to the cache data memory 40, bypassing the address buffer 50. The way selecting circuit 55 selects way information that is received from the way controlling circuit 44 in synchronization with the operation of the index selecting circuit 54, regardless of whether or not the instruction release signal has been issued, and sends the selected way information to the first selecting circuit 47.

In other words, in the conditions that an index included in a data request address is generated and the address buffer 50 is empty, the data stored in the output buffer 49 is sent to the instruction executing unit, the cache data memory 40 is accessed, bypassing the address buffer 50. The obtained data is stored in the output buffer 49. When the output buffer 49 is not empty, the data stored in the output buffer 49 is sent to the instruction executing unit, the cache data memory 40 is accessed with the index read from the address buffer 50. The obtained data is stored in the output buffer 49. In addition, the newly generated index is stored in the address buffer 50.

FIG. 6A is a timing chart showing a data supplying operation according to the embodiment shown in FIG. 5. In the timing chart, it is assumed that the address buffer 40 has three stages 0, 1, and 2. The cache data memory 40 has two ways. Data AAAA, BBBB, . . . , and HHHH are stored at addresses 1000, 1004, . . . , and 1028 of the cache data memory 40, respectively.

The timing chart shown in FIG. 6A represents almost the same operation as the timing chart corresponding to the direct mapping method shown in FIG. 4A. The difference between the data supplying operations shown in FIGS. 5 and 3 is in that data is read from the cache data memory 40 corresponding to way select bits that represent a way of the cache data memory 40 in which requested data is stored.

Way select bits 0, 1, and 2 of the way buffer 51 store way information corresponding to entries of the stages 0, 1, and 2 of the address buffer 50, respectively. When the value of each way select bit is 0, it represents that the first way is hit. When the value of each way select bit is 1, it represents that the second way is hit.

Cache data address selector OUT/IN represents a control signal that is input from the address buffer 50 to the selecting circuits 54 and 55. When the cache data address selector is OUT, the output of the cache data address buffer 41' and the output of the way controlling circuit 44 are selected. When the cache data address selector is IN, the output of the address buffer 50 and the output of the way buffer 51 are selected. When the address buffer 50 is empty, the signal OUT is output. When the address buffer 50 is not empty, the signal IN is output.

The way select information that is output from the selecting circuit 55 is used to control the selecting circuit 47. The other features of the data supplying operation are the same as those shown in FIG. 4A.

Figure 6B:
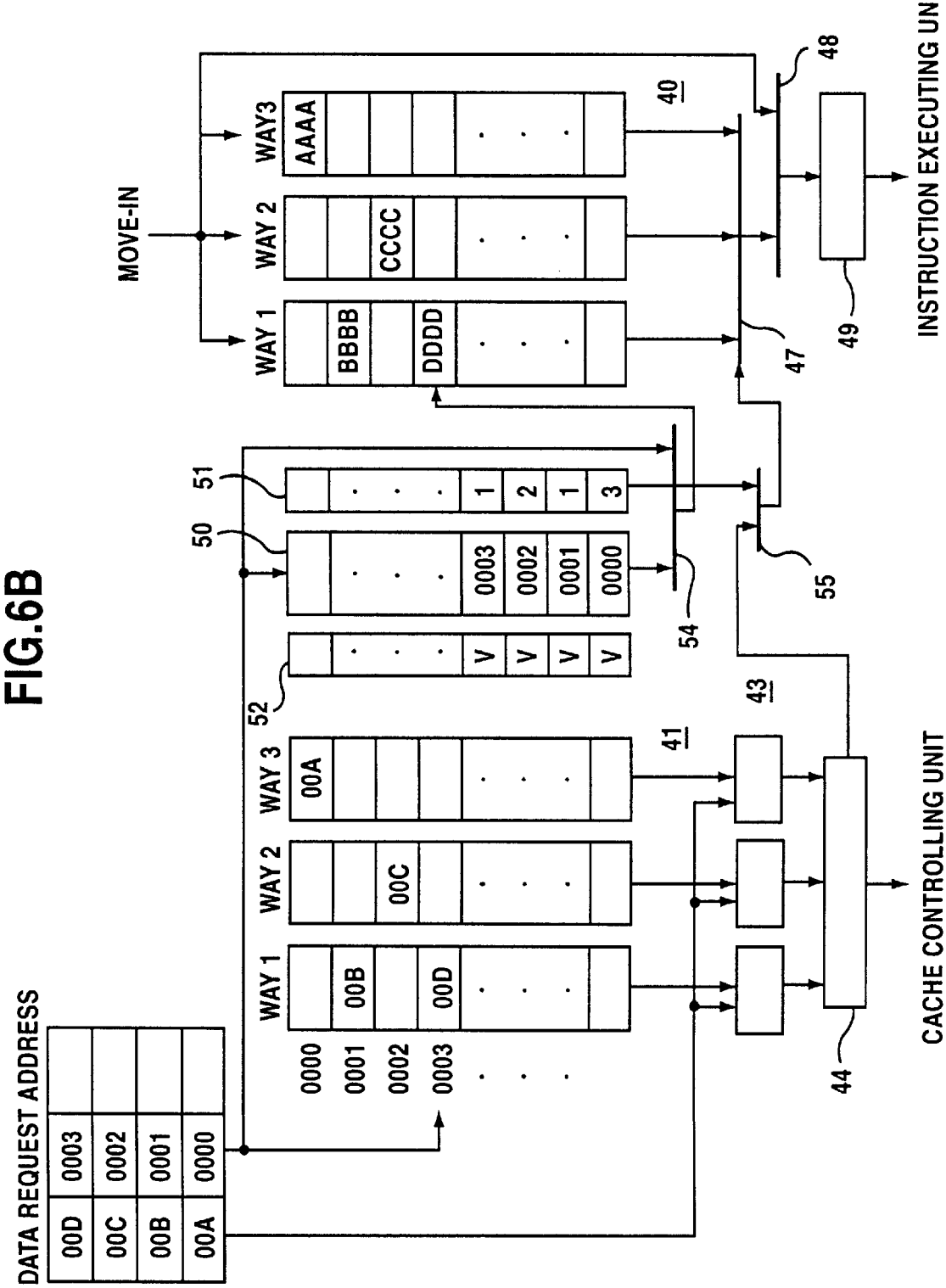
FIG. 6B is a schematic diagram showing data stored in an address buffer of an embodiment of the set associative system.

FIG. 6B is a schematic diagram showing data stored in the data supplying apparatus shown in FIG. 5. In FIG. 6B, each of the cache tag memory 41 and the cache data memory 40 has three ways.

The tags 00B and 00D are stored at the addresses 0001 and 0003 of the way 1 of the cache tag memory 41. The tag 00C is stored at the address 0002 of the way 2. The tag 00A is stored at the address 0000 of the ways 3. The data BBBB, DDDD, CCCC, and AAAA are stored at relevant addresses of relevant ways of the cache data memory 40.

In the case that at least one index is stored in the address buffer 50, as represented at an upper left portion of FIG. 6B, when data request addresses having the indexes 0000, 0001, 0002, and 0003 are successively supplied, these indexes are successively input to the address buffer 50 and stored.

At this point, the result of the hit determination of the comparing circuit 43 is stored as a valid bit V in the valid buffer 52. A hit way number is stored as a way select bit in the way buffer 51.

The selecting circuit 54 reads an index from the address buffer 50 and sends the index to the cache data memory 40. The selecting circuit 55 reads a way select bit from the way buffer 51 and sends the way select bit to the selecting circuit 47. Thus, the data AAAA, BBBB, CCCC, and DDDD are successively output to the output buffer 49.

In the set associative type cache unit according to the embodiment shown in FIG. 5, data stored in the cache data memory 40 can be supplied to the instruction executing unit, not buffered.

Figure 7:
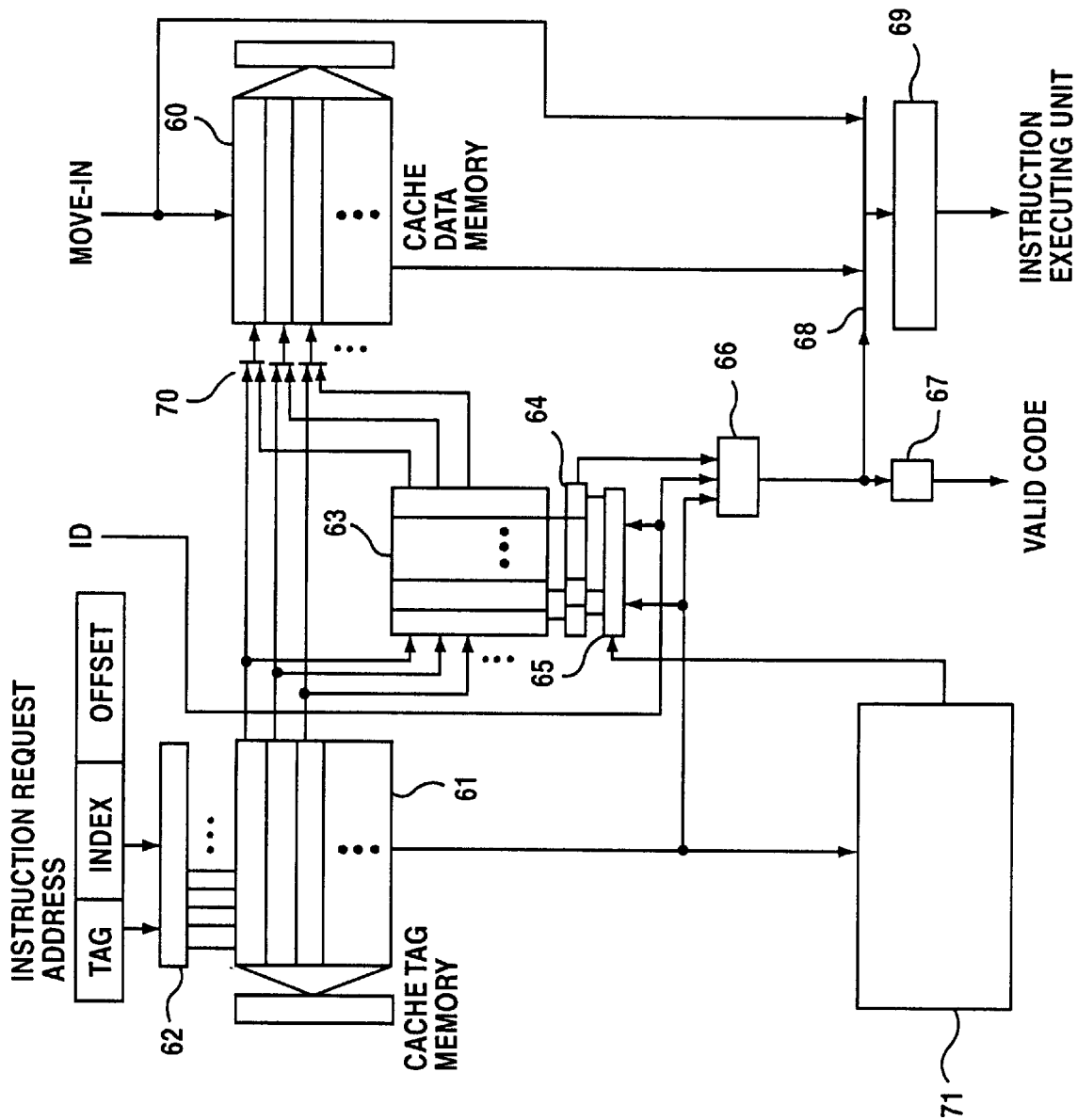
FIG. 7 is a block diagram showing a structure of a first embodiment of a full associative memory system.

FIG. 7 is a block diagram showing a structure of a first embodiment of a full associative memory type cache unit.

In FIG. 7, reference numeral 60 is a cache data memory that stores data. Reference numeral 61 is a cache tag memory that stores data corresponding to data stored in the cache data memory 60. The cache tag memory 61 is, for example, a CAM (content addressable memory). The cache tag memory 61 outputs a hit signal corresponding to directory data that accords with a tag and an index included in a data request address. In addition, the cache tag memory 61 outputs a miss-hit signal corresponding to directory data that does not accord with a tag and an index included in a data request address. Reference numeral 62 is an input buffer that stores a tag and an index included in a data request address supplied to the cache tag memory 61.

Reference numeral 63 is an address buffer that stores pattern data composed of a plurality of hit/miss-hit signals received from the cache tag memory 61 in the FIFO format. Reference numeral 64 is a valid buffer that stores valid information of data represented with pattern data stored in the address buffer 63. The valid information stored in the valid buffer 64 represents a validity in the case that the hit signal is present in the pattern data. The valid information represents an invalidity in the case that the hit signal is absent in the pattern data.

Reference numeral 65 is a first valid controlling circuit that controls valid information stored in the valid buffer 64. Reference numeral 66 is a second valid controlling circuit that controls valid information of data that is sent to the instruction executing unit. Reference numeral 67 is an output buffer that stores valid information of data to be sent to the instruction executing unit. Reference numeral 68 is a selecting circuit that selects one of data received from the cache data memory 60 and move-in data corresponding to the valid information of the data sent to the instruction executing unit as a selection control signal, and sends the selected data to the instruction executing unit. Reference numeral 69 is an output buffer that stores data sent to the instruction executing unit.

Reference numeral 70 is a pattern data selecting circuit that selects pattern data stored in the address buffer 63 and sends the selected data to the cache data memory 60. Alternatively, the pattern data selecting circuit 70 selects pattern data received from the cache tag memory 61 and sends the selected pattern data to the cache data memory 60, bypassing the address buffer 63. Reference numeral 71 is a cache controlling unit that controls the entire cache unit. ID is identification information that represents a miss-hit of move-in data.

In the cache unit according to the embodiment shown in FIG. 7, when the instruction executing unit issues a pre-fetch request with a data request address, the cache tag memory 61 outputs a hit signal to an entry of the cache data memory 60 corresponding to directory data that accords with a tag and an index included in a data request address. In addition, the cache tag memory 61 outputs a miss-hit signal to an entry of the cache data memory 60 corresponding to directory data that does not accords with the tag and the index included in the data request address. The address buffer 63 stores pattern data of hit/miss-hit signals in the FIFO format. The first valid controlling circuit 65 generates valid information. The valid information represents a validity in the case that a hit signal is present in the pattern data. The valid information represents an invalidity in the case that the hit signal is absent in the pattern data. The first valid controlling circuit 65 writes the valid information to the valid buffer 64.

The hit/miss-hit indication pattern data is stored in the address buffer 63 in the FIFO format. Valid information of data represented with pattern data stored in the address buffer 63 is stored in the valid buffer 64. When the instruction executing unit issues the data release signal and the address buffer 63 stores pattern data, the pattern data selecting circuit 70 reads the pattern data and sends it to the cache data memory 60. When the address buffer 63 does not store pattern data, the pattern selecting circuit 70 selects pattern data received from the cache tag memory 61 corresponding to a data request address and sends the selected pattern data to the cache data memory 60, bypassing the address buffer 63.

The cache data memory 60 receives the pattern data from the pattern data selecting circuit 70, reads data represented by the hit signal of the pattern data, and sends the data to the instruction executing unit through the output buffer 69. At this point, when the pattern data selecting circuit 70 selects pattern data stored in the address buffer 63, the second valid controlling circuit 66 reads valid information corresponding to the pattern data stored in the address buffer 63 from the valid buffer 64 and sends the valid information to the instruction executing unit through the output buffer 67. When the pattern data selecting circuit 70 selects pattern data received from the cache tag memory 61, the second valid controlling circuit 66 generates valid information. The valid signal represents a validity in the case that the hit signal is present in the pattern data. The valid signal represents an invalidity in the case that the hit signal is absent in the pattern data. The second valid controlling circuit 66 sends the valid information to the instruction executing unit through the output buffer 67.

In this operation, when the address buffer 63 is empty, the pattern data selecting circuit 70 selects pattern data received from the cache tag memory 61 regardless of whether or not the data release signal has been issued, and sends the pattern data to the cache data memory 60, bypassing the address buffer 63.

In other words, in the conditions that pattern data is output from the cache tag memory 61 corresponding to a data request address and the address buffer 63 is empty, the data stored in the output buffer 69 is sent to the instruction executing unit, the cache data memory 60 is accessed, bypassing the address buffer 63. The obtained data is stored in the output buffer 69. When the address buffer 63 is not empty, the data stored in the output buffer 69 is sent to the instruction executing unit, the cache data memory 60 is accessed with the pattern data read from the address buffer 63. The obtained data is stored in the output buffer 69. In addition, the newly output pattern data is stored in the address buffer 63.

Figure 8A:
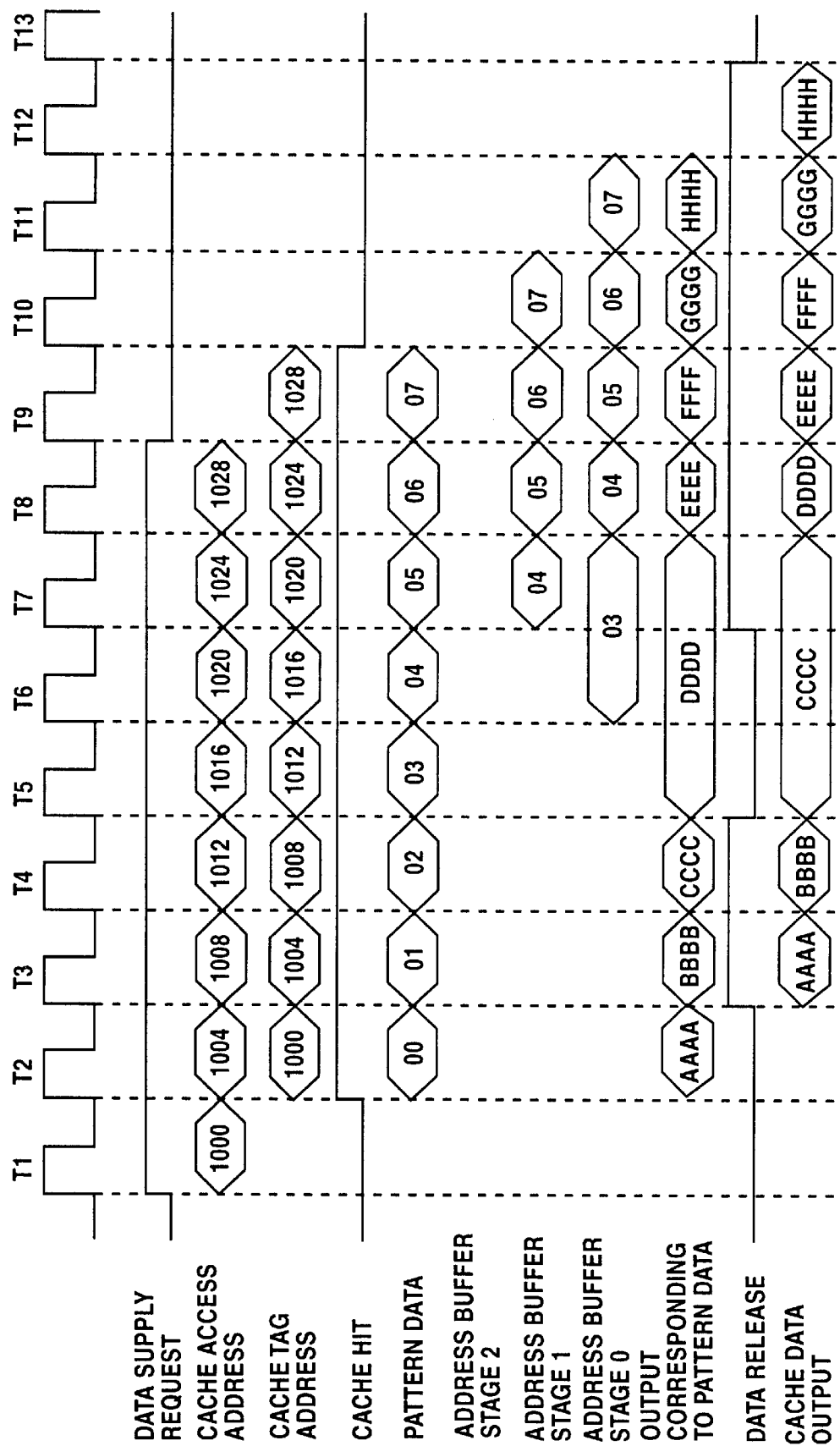
FIG. 8A is a timing chart showing an operation of the first embodiment of the full associative memory system.

FIG. 8A is a timing chart showing the data supplying operation according to the embodiment shown in FIG. 7. In the timing chart, it is assumed that the address buffer 63 has three stages 0, 1, and 2. In addition, it is assume that data AAAA, BBBB, . . . , and HHHH are stored at addresses 1000, 1004, . . . , and 1028 of the cache data memory 70, respectively.

The cache access address corresponds to a tag and an index included in a data request address. When the cache access address is input to the cache tag memory 61, it is treated as a cache tag address. Pattern data represents a pattern of hit/miss signals that are output simultaneously from the cache tag memory 61.

In FIG. 8A, a control signal that is output from the address buffer 63 to the pattern data selecting circuit 70 is not shown. This control signal functions in the same manner as the cache data address selector shown in FIG. 4A. Thus, the pattern data selecting circuit 70 selects pattern data received from the cache tag memory 61 in cycles T2 to T5. After cycle T6, the pattern data selecting circuit 70 selects pattern data received from the address buffer 63.

Data corresponding to the hit signal of the pattern data selected by the selecting circuit 70 is output from the cache data memory 60. Thereafter, cache data is output from the output buffer 69.

When a cache access request (data access request) is received along with the cache access address 1000 in cycle T1, the cache tag memory 61 is accessed in cycle T2. Thus, pattern data 00 is output from the cache tag memory 61. At this point, since the address buffer is empty, the pattern data is sent to the cache data memory 60, bypassing the address buffer 63. Thus, the relevant data AAAA is output from the cache data memory 60 and written to the output buffer 69. In cycle T3, in synchronization with the issuance of the data release signal, the data AAAA is sent to the instruction executing unit.

On the other hand, when the stop of the data release signal is detected in cycle T5, the data CCCC is stored in the output buffer 69. In addition, a storing process for the address buffer 63 is performed. The address 1012 corresponding to the data DDDD is sent to the cache data memory 60 and thereby pattern data 03 is obtained. In cycle T6, the address 1016 of the cache tag memory 61 is accessed and thereby pattern data 04 is obtained. Pattern data 03 is stored in the stage 0 of the address buffer 63. Since the data release signal is not issued in cycle T6, the pattern data 03 is again stored in the stage 0 of the address buffer 63. In addition, the requested pattern data 04 corresponding to the address 1016 is stored in the stage 1 of the address buffer 63 in cycle T7. When the issuance of the data release signal is detected in cycle T7, the address buffer 63 starts the FIFO operation and successively reads pattern data from the address buffer 63. Thus, the pattern data is read from the cache data memory 60 and sent to the instruction executing unit.

FIG. 8B is a schematic diagram showing data stored in the data supplying apparatus shown in FIG. 7. In FIG. 8B, directory data 0002, 0000, 0001, and 0003 are stored in the cache tag memory 61. Data CCCC, AAAA, BBBB, and DDDD are stored at relevant addresses of the cache data memory 60.

As represented at a upper left portion of FIG. 8B, when data request addresses 0000, 0001, 0002, and 0003 are successively supplied, pattern data corresponding to these addresses is output from the cache tag memory 61. When the address buffer 63 stores at least one pattern as the pattern data, the patterns are successively input to the address buffer 63 and stored.

"1" of the pattern data is a hit signal that represents that relevant directory data is hit. "0" of the pattern data is a miss signal that represents that relevant directory data is missed. Normally, one pattern includes one hit signal corresponding to hit directory data.

The result of the hit determination of the cache tag memory 61 is stored as valid information in the valid buffer 64. The valid information is denoted by V and represents that relevant pattern data includes the hit signal.

The pattern data is read from the address buffer 63 by the selecting circuit 70 and sent to the cache data memory 60. The cache data memory 60 outputs data corresponding to the position of the hit signal of the pattern data. As a result, the data AAAA, BBBB, CCCC, and DDDD are successively output to the output buffer 69.

The valid controlling circuits 65 and 66 shown in FIG. 7 function as the rewriting circuit 19 as with the valid controlling circuits 30 and 24 shown in FIG. 3. When the valid controlling circuit 65 receives a move-in ID, it should rewrite not only the valid information stored in the valid buffer 64, but the pattern data stored in the relevant address buffer 63.

When valid information is in the move-in ID waiting state, all patterns corresponding to the valid information are 0. In this case, when an ID is received from the external storing unit, "0" at the position corresponding to the relevant entry of the cache data memory 60 in which the move-in data is stored is rewritten to "1". The valid information is rewritten to enable state and the move-in data is enabled.

Thus, in the associative memory type cache unit according to the embodiment shown in FIG. 7, data stored in the cache data memory 60 can be sent to the instruction executing unit, not buffered.

Figure 9:
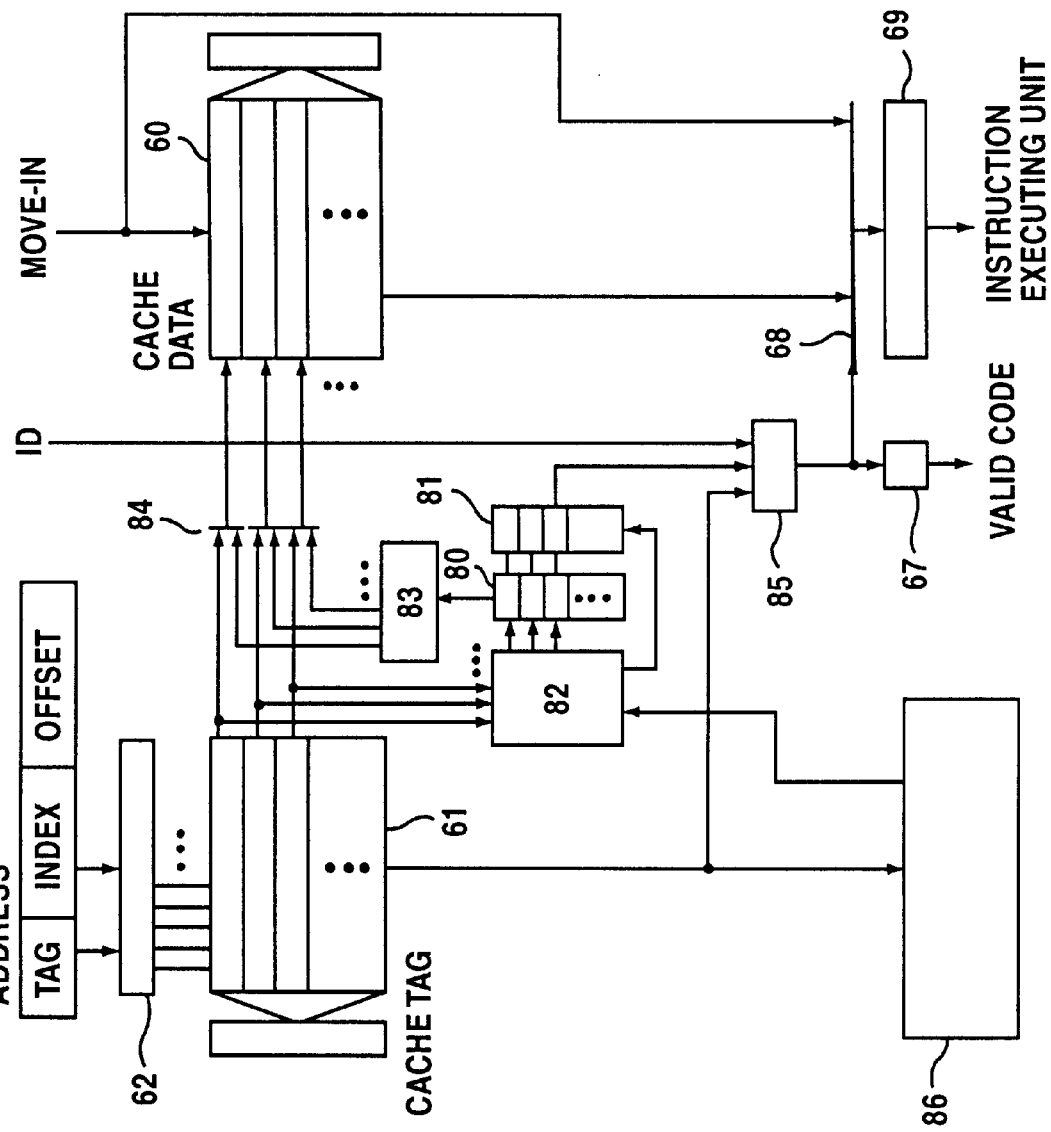
FIG. 9 is a block diagram showing a structure of a second embodiment of the full associative memory system.

FIG. 9 is a block diagram showing a structure of a second embodiment of a full associative memory type cache unit. In FIG. 9, similar portions to those in FIG. 7 are denoted by the same reference numerals.

Reference numeral 80 is an address buffer that stores issuance sequence numbers that represent the output order of pattern data received from the cache tag memory 61 in correlation with entries of the cache tag memory 61. Reference numeral 81 is a valid buffer that stores valid information of data represented with issuance sequence numbers stored in the address buffer 80. The valid information stored in the valid buffer 81 represents a validity in the case that an issuance sequence number is present. The valid information represents an invalidity in the case that an issuance sequence number is absent.

Reference numeral 82 is a main controlling circuit that controls issuance sequence numbers stored in the address buffer 80. In addition, the main controlling circuit 82 controls valid information stored in the valid buffer 81. Reference numeral 83 is a pattern data generating circuit that generates pattern data including the hit signal in the order of the issuance sequence numbers in the case that the address buffer 80 stores the issuance sequence numbers. The pattern data generating circuit 83 accords with the generating circuit 15 shown in FIG. 2A.

Reference numeral 84 is a pattern data selecting circuit that selects pattern data generated by the pattern data generating circuit 83 and sends the selected pattern data to the cache data memory 60. Alternatively, the pattern data selecting circuit 84 selects pattern data received from the cache tag memory 61 and sends the selected pattern data to the cache data memory 60, bypassing the address buffer 80. Reference numeral 85 is a valid control circuit that controls the valid information of data sent to the instruction executing unit. Reference numeral 86 is a cache controlling circuit.

The main controlling circuit 82 and the valid controlling circuit 85 shown in FIG. 9 function as the rewriting circuit 19 as with the valid controlling circuits 30 and 24 shown in FIG. 3.

In the cache unit according to the embodiment shown in FIG. 9, when the instruction executing unit issues a pre-fetch request with a data request address, the cache tag memory 61 outputs a hit signal to an entry of the cache data memory 60 corresponding to directory data that accords with a tag and an index included in the data request address. On the other hand, the cache tag memory 61 outputs a miss-hit signal to an entry of the cache data memory 60 corresponding to directory data that does not accord with a tag and an index included in the data request address. The main controlling circuit 82 writes issuance sequence numbers to the entries of the address buffer 80 represented by the hit signal. In addition, the main controlling circuit 82 writes valid information that represents the validity to the entries of the valid buffer 81 represented with the hit signal.

Thus, in the conditions that issuance sequence numbers are stored in the address buffer 80 and the valid information of the data represented with the issuance sequence numbers is stored in the valid buffer 81, the pattern data generating circuit 83 generates pattern data including a hit signal corresponding to a stored position of an issuance sequence number in the order of the issuance sequence numbers. Thus, when the pattern data generating circuit 83 generates pattern data, the pattern data selecting circuit 84 selects the generated pattern data and sends the selected pattern data to the cache data memory 60. When the pattern data generating circuit 83 does not generate pattern data (namely, the address buffer 80 does not store issuance sequence number), the pattern data selecting circuit 84 selects pattern data received from the cache tag memory 61 corresponding to the data request address and sends the selected pattern data to the cache data memory 60, bypassing the address buffer 80.

When the cache data memory 60 receives the pattern data from the pattern data selecting circuit 84, the cache data memory 60 reads data corresponding to the hit signal included in the pattern data and sends the data to the instruction executing unit through the output buffer 69. At this point, when the pattern data selecting circuit 84 selects pattern data generated by the pattern data generating circuit 83, the valid controlling circuit 85 reads valid information corresponding to the pattern data from the valid buffer 81 and sends the valid information to the instruction executing unit through the output buffer 67. When the pattern data selecting circuit 84 selects pattern data received from the cache tag memory 61, the valid controlling circuit 85 generates valid information. The valid information represents a validity in the case that the hit signal is present in the pattern data. The valid information represents an invalidity in the case that the hit signal is absent in the pattern data. The valid controlling circuit 85 sends the valid information to the instruction executing unit through the output buffer 67 corresponding to the pattern data.

In this operation, when the address buffer 80 is empty, regardless of whether or not the data release signal has been issued, the pattern data selecting circuit 84 selects pattern data received from the cache tag memory 61 and sends the selected pattern data to the cache data memory 60, bypassing the address buffer 80.

In other words, in the conditions that pattern data is received from the cache tag memory 61 corresponding to a data request address and the address buffer 80 does not store issuance sequence numbers, data stored in the output buffer 69 is sent to the instruction executing unit, the cache data memory 60 is accessed, bypassing the address buffer 80. The obtained data is stared in the output buffer 69. When the address buffer 80 stores issuance sequence numbers, data stored in the output buffer 69 is sent to the instruction executing unit, the cache data memory 60 is accessed with the pattern data generated by the pattern data generating circuit 83. The obtained data is stored in the output buffer 69. In addition, an issuance sequence number of the newly output pattern data are stored in the address buffer 80.

Thus, the address buffer 80 according to the embodiment controls information necessary to access the cache data memory 60 with issuance sequence numbers of the hit signal included in pattern data in a method equivalent to the FIFO format.

Figure 10:
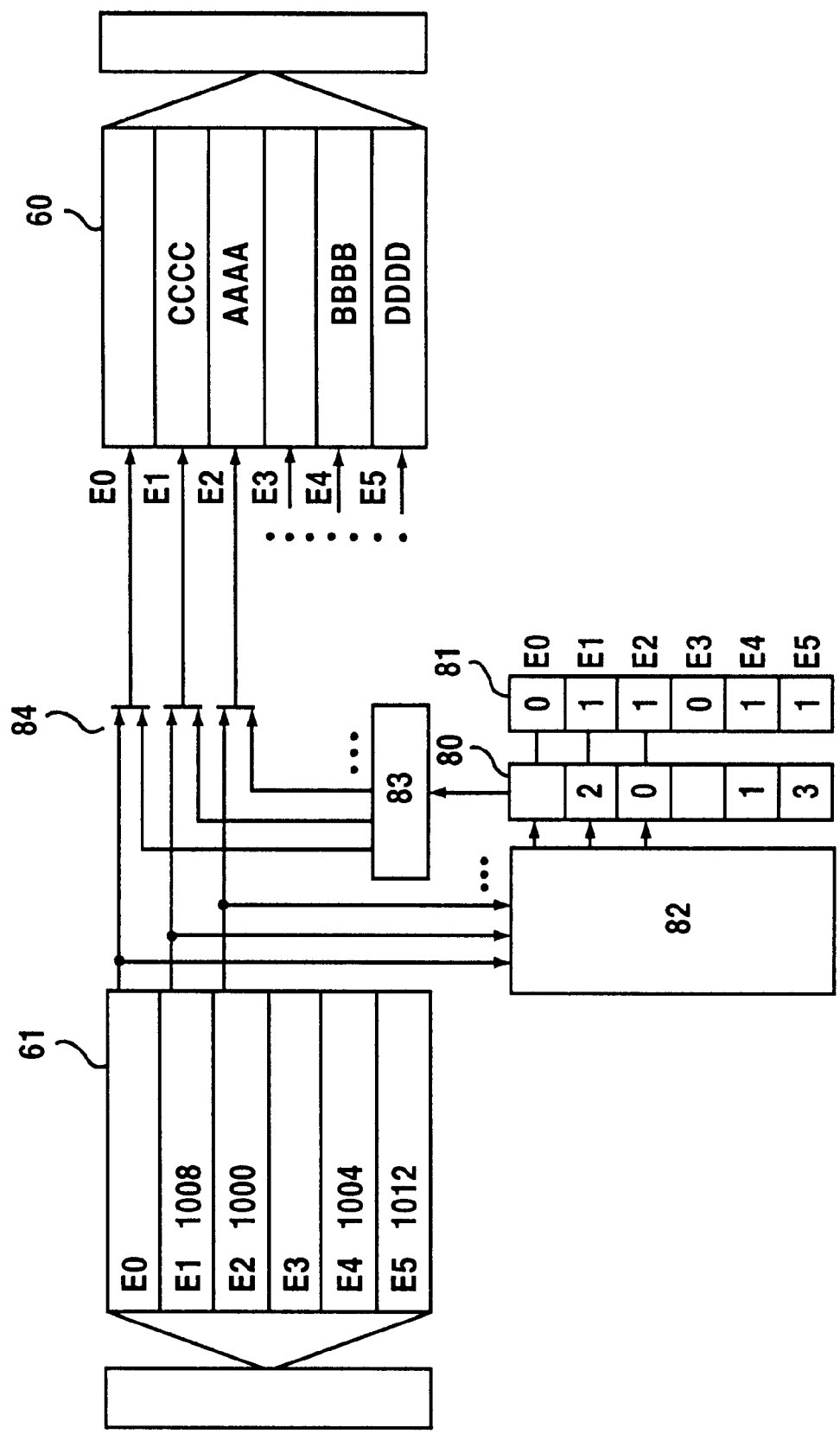
FIG. 10 is a schematic diagram showing data stored in an address buffer of the second embodiment of the full associative memory system.

FIG. 10 is a schematic diagram showing data stored in the address buffer 80.

In FIG. 10, it is assumed that the cache tag memory 61 stores data AAAA, BBBB, CCCC, and DDDD at addresses 1000, 1004, 1008, and 1012 as entry positions E2, E4, E1, and E5, respectively. The addresses 1000, 1004, 1008, and

1012 are successively hit corresponding to data supply requests. Correspondingly, the address buffer 80 stores issuance sequence numbers "0", "1", "2", and "3" at the entry positions "E2", "E4", "E1", and "E5", respectively.

Valid information "1" stored in the valid buffer 81 represents that a valid issuance sequence number is stored at a relevant entry position. Valid information "0" represents that an issuance sequence number is not stored at a relevant entry position. In the initial state, all valid information in the valid buffer 81 is set to "0".

Figure 11:
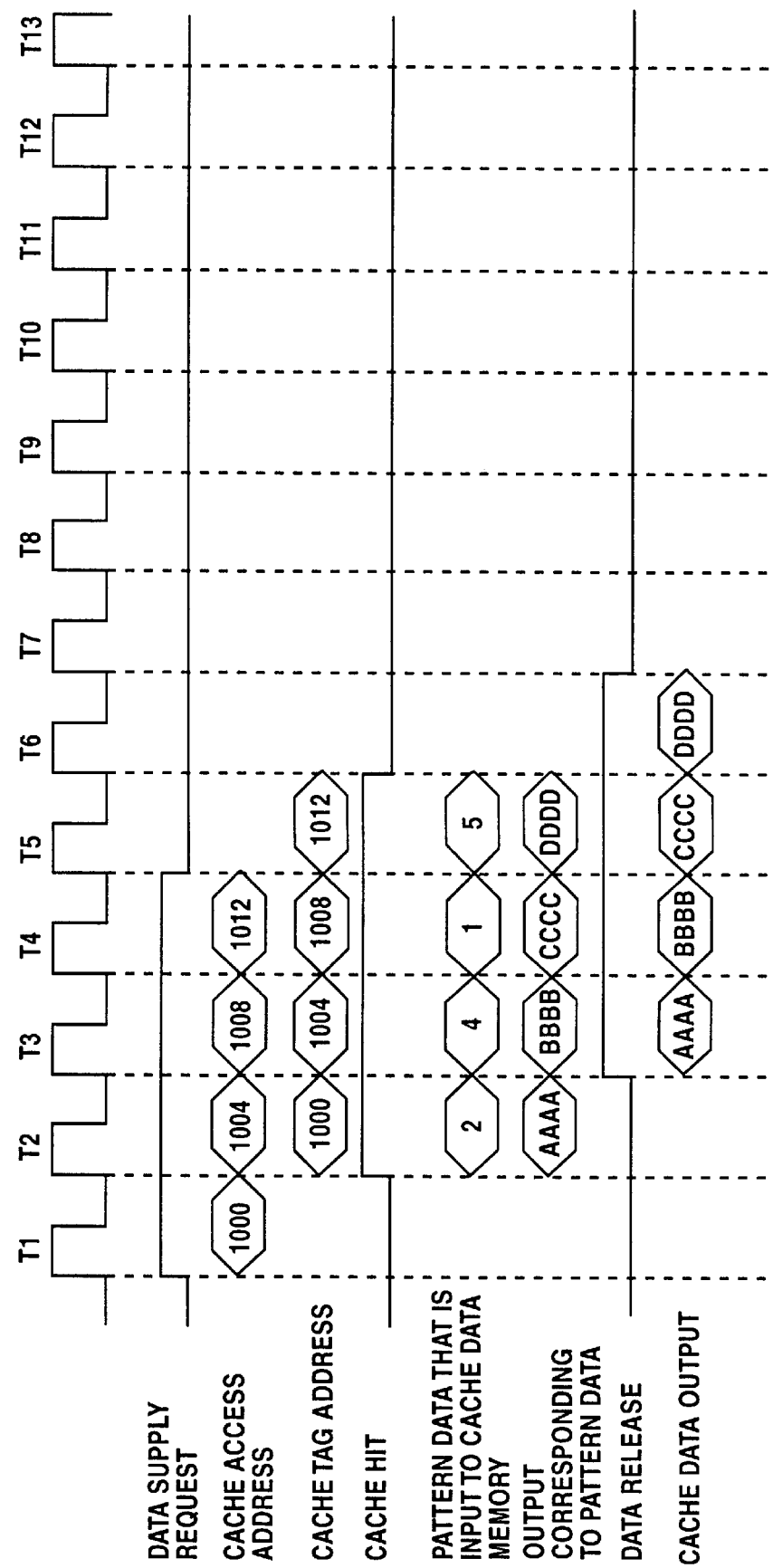
FIG. 11 is a first timing chart showing an operation of the second embodiment of the full associative memory system.

FIG. 11 is a timing chart in the case that the data release signal is issued when the address buffer 80 does not store issuance sequence numbers.

As shown in the timing chart, when the address buffer 80 does not store issuance sequence numbers, regardless whether or not the data release signal is issued, pattern data received from the cache tag memory 61 is sent to the cache data memory 60, bypassing the address buffer 80. Pattern data "2", "4", "1", and "5" have the hit signal at the entry positions E2, E4, E1, and E5, respectively. Thus, the data AAAA, BBBB, CCCC, and DDDD are successively read from the cache data memory 60 and sent to the instruction executing unit.

Referring to the timing chart, in cycle T2, the data AAAA is read from the cache data memory 60. In cycle T3, the data release signal is issued and the data is sent. However, as shown in FIG. 12, when the data release signal is issued in cycle T6, the pattern data 1 and 5 are temporarily stored as issuance sequence numbers in the address buffer 80.

Thus, in cycles T3 to T6, the pattern data "4" is stored in the cache data memory 60 and the relevant data BBBB is output. At this point, the data AAAA is output from the output buffer 69.

When the data release signal is issued in cycle T6, the data CCCC and DDDD are successively read from the cache data memory 60 corresponding to the pattern data generated corresponding to these issuance sequence numbers and sent to the instruction executing unit.

Figure 12:
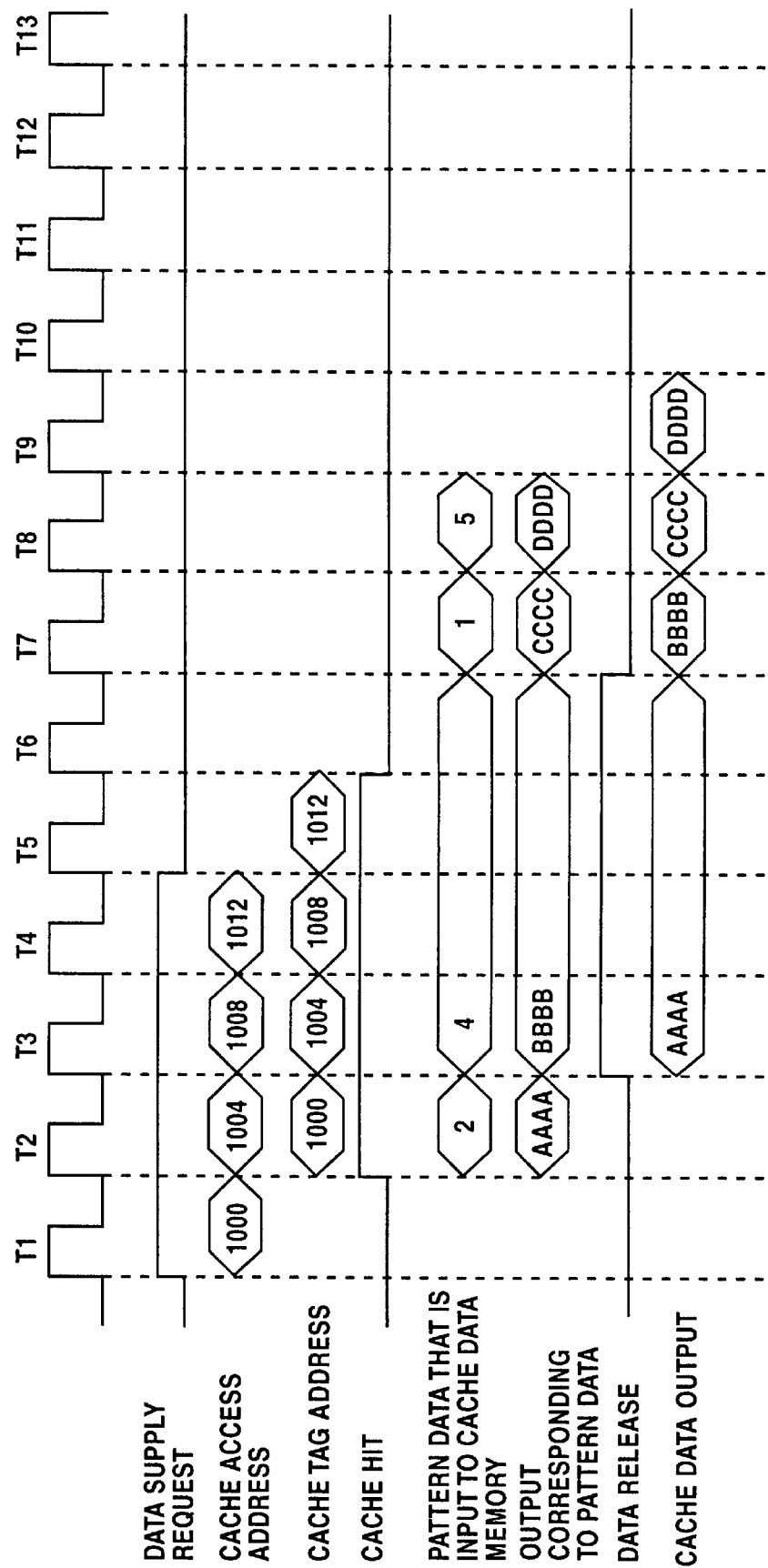
FIG. 12 is a second timing chart showing an operation of the second embodiment of the full associative memory system.

In FIGS. 11 and 12, a control signal that is supplied from the address buffer 80 to the pattern data selecting circuit 84 is not shown. As with the cache data address selector shown in FIG. 4A, the control signal varies depending on whether or not the address buffer 80 is empty. In FIG. 12, in cycles T2 to T3, the pattern data selecting circuit 84 selects pattern data received from the cache tag memory 61. After cycle T4, the pattern data selecting circuit 84 selects the pattern data received from the pattern data generating circuit 83.

Thus, in the associative memory type cache unit according to the embodiment shown in FIG. 9, as with the embodiment shown in FIG. 7, data stored in the cache data memory 60 can be supplied to the instruction executing unit, not buffered.

The address buffer 80 does not store pattern data itself, but issuance sequence numbers whose data amount is smaller than that of the pattern data. Thus, the storage capacity of the address buffer 80 is smaller than that of the address buffer 63 shown in FIG. 7.

In the case that the address buffer 63 has, for example, eight entries, when the number of entries of the cache tag memory 61 is N, the storage capacity of the address buffer 63 is 8 N. On the other hand, in the address buffer 80, since eight entries can be distinguished with three-bit issuance sequence numbers, the required storage capacity of the address buffer is 3 N. Thus, information can be stored with a smaller storage capacity than before.

Figure 13:
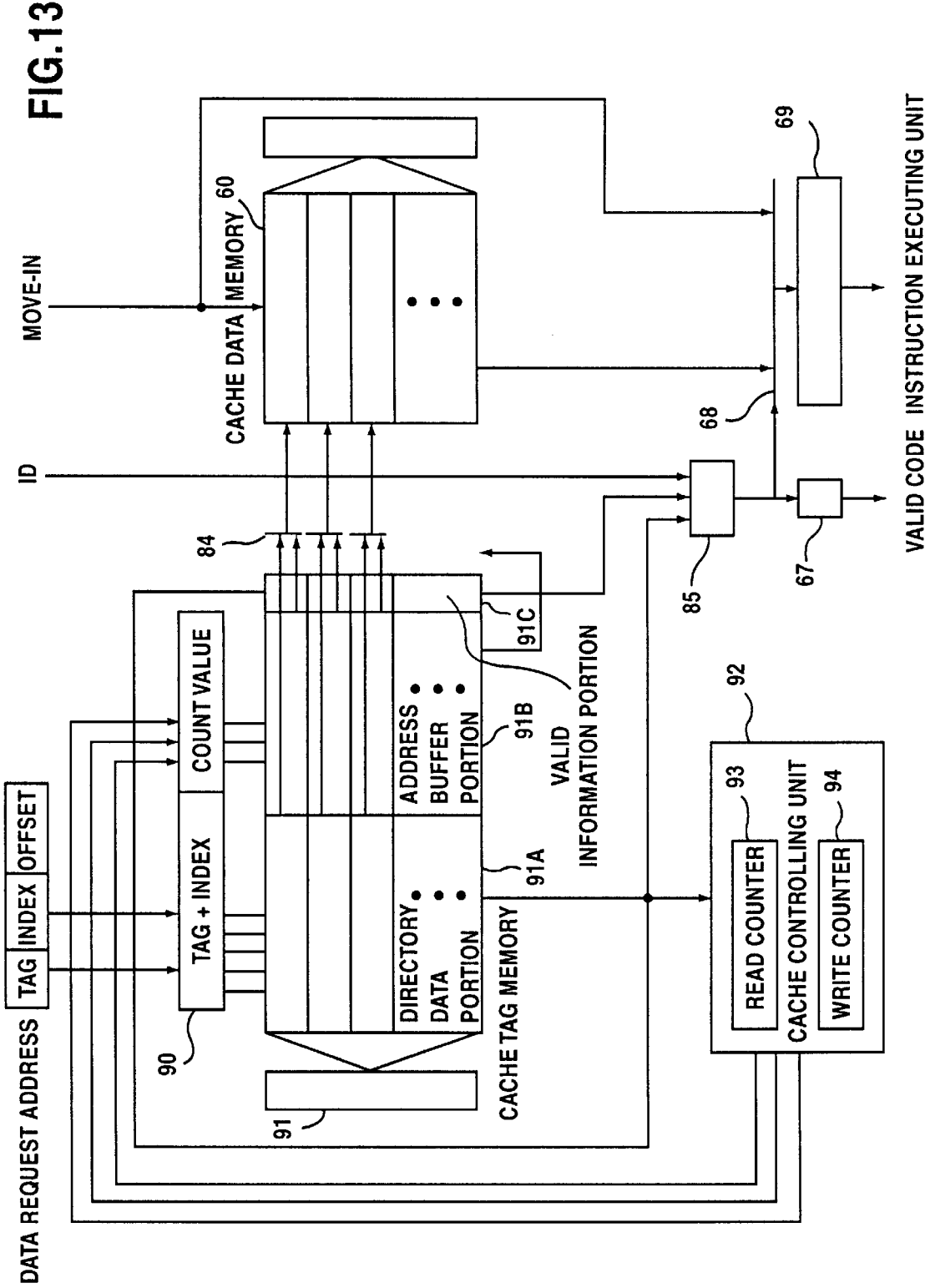
FIG. 13 is a block diagram showing a structure of a third embodiment of the full associative memory system.

FIG. 13 is a block diagram showing a structure of a third embodiment of a full associative memory type cache unit. A cache tag memory 91 shown in FIG. 13 has a structure of which the cache tag memory 61, the address buffer 80, and the valid buffer 81 shown in FIG. 9 are formed in the same CAM. In FIG. 13, similar portions to those in FIG. 9 are denoted by the same reference numerals.

The cache tag memory 91 comprises a directory data portion 91A, an address buffer portion 91B, and a valid information portion 91C. The directory data portion 91A stores directory data. The address buffer portion 91B stores issuance sequence numbers. The valid information portion 91C stores valid information. An input buffer 90 stores a tag and an index included in data request address. In addition, the input buffer 90 stores a count value received from a cache controlling unit 92. The input buffer 90 sends the tag and index included in the data request address and the count value to the cache tag memory 91.

A cache controlling unit 92 has a read counter 93 and a write counter 94. The read counter 93 generates issuance sequence numbers to be read from the cache tag memory 91. The write counter 94 generates issuance sequence numbers to be written to the cache tag memory 91.

The count value of the read counter 93 is incremented by 1 in each cycle when the data release signal is issued. On the other hand, the count value of the write counter 94 is incremented by 1 in each cycle regardless of whether or not the data release signal is issued. If necessary, these count values are sent to the cache tag memory 91 through the input buffer 90.

In the data supplying apparatus shown in FIG. 13, when a tag and an index stored in the input buffer 90 are hit to any directory data, a hit signal corresponding to the entry position is generated. The hit signal becomes a write enable signal. With the write enable signal, an issuance sequence number generated by the write counter 94 is written to the same line as the directory data in the address buffer portion 91B.

Valid information that represents a validity is generated by the directory data portion 91A. The valid information is written to the same line as the hit directory data in the valid information portion 91C.

When the tag and the index are not hit to any directory data, the write enable signal at the position corresponding to data to be removed from the cache data memory 60 is turned on. The relevant valid information represents a move-in data ID waiting state. At this point, the valid controlling circuit 85 and the cache controlling unit 92 function as the rewriting circuit 19 as with the valid controlling circuits 24 and 30 shown in FIG. 3.

A control signal that represents whether or not the address buffer portion 91B is empty is input to the pattern data selecting circuit 84. When the address buffer portion 91B is not empty, the pattern data selecting circuit 84 selects pattern data stored in the address buffer portion 91B. When the address buffer portion 91B is empty, the pattern data selecting circuit 84 selects pattern data received from the directory data portion 91A.

The address buffer portion 91B simultaneously compares issuance sequence numbers generated by the read counter 93 with individual entries and generates pattern data including the hit signal corresponding to hit entries. The pattern data is sent to the cache data memory 60 through the pattern data selecting circuit 84. Data at the entry position corresponding to the hit signal is output.

Figure 14:
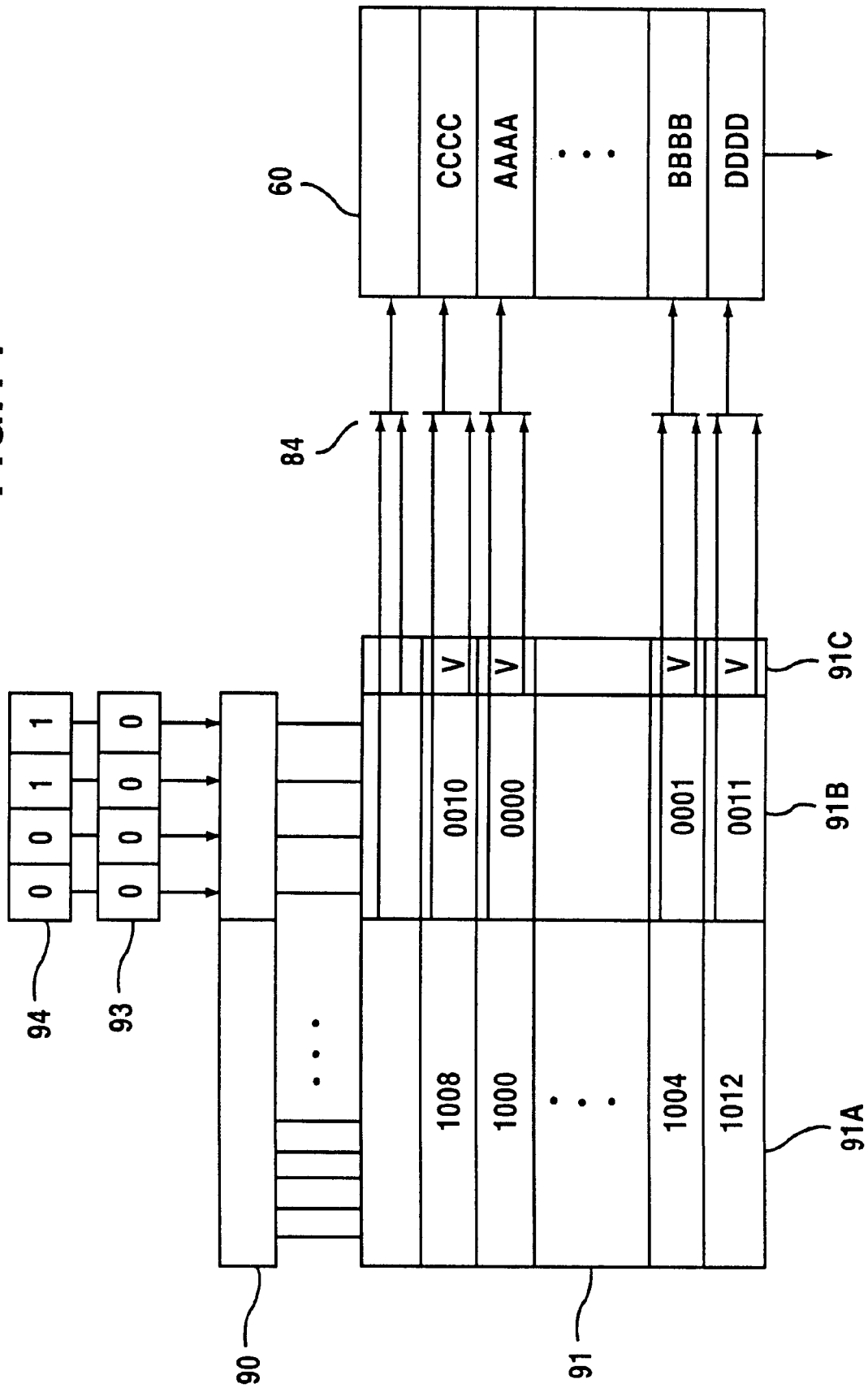
FIG. 14 is a schematic diagram showing data stored in an address buffer of the third embodiment of the full associative memory system.

FIG. 14 is a schematic diagram showing data stored in the data supplying apparatus shown in FIG. 13. In FIG. 14, directory data 1008, 1000, 1004, and 1012 are stored in the directory data portion 91A of the cache tag memory 91. Data CCCC, AAAA, BBBB, and DDDD are stored at relevant addresses of the cache data memory 60.

Four-bit issuance sequence numbers 0010, 0000, 0001, and 0011 that represent a hit order of directory data are stored in relevant lines of the address buffer portion 91B. Valid information V that represents a validity is stored in relevant lines of the valid information portion 91C. When a miss-hit takes place, valid information M that represents an ID waiting state is stored in a relevant line of the valid information portion 91C. Valid information IV that represent an invalidity is stored in lines in which issuance sequence numbers are not present.

In FIG. 14, the count value of the read counter 93 is 0000 that represents that the data read from the cache data memory 60 is data corresponding to the entry position of the issuance sequence number of the address buffer portion 91B.

The count value of the write counter 94 is 0011 that represents that the issuance sequence number 0011 has been written to the address buffer portion 91B. When four-bit issuance sequence numbers are used, up to 16 entries can be distinguished.

When the count value of the read counter 93 is incremented and sent to the address buffer portion 91B, pattern data including the hit signal corresponding to the position at which the value is stored is successively generated. The pattern data is sent to the cache data memory 60 by the pattern data selecting circuit 84 and output in the order of the data AAAA, BBBB, CCCC, and DDDD.

According to the structure shown in FIG. 13, the address buffer and the valid buffer can be formed as a part of the cache tag memory 91. Thus, the hardware amount can be further reduced from the structure shown in FIG. 9. Since the wiring of the address buffer and the valid buffer can be disposed in one CAM, the signal delay can be reduced and the speed of the data supplying operation can be further increased.

In the above-described embodiments, the valid information (that represents whether or not data stored in the address buffers 28, 50, 63, and 80 and the address buffer portion 91B is valid and that is stored) stored in the valid buffers 29, 52, 64, and 81, and the valid information portion 91C, is rewritten by the valid controlling circuits 30, 53, and 65, the main controlling circuit 82, and the cache controlling circuit 92. Since the move-in process is executed corresponding to a branch instruction or the like, data corresponding to the valid information becomes valid or invalid. However, in this case, a circuit structure for performing a rewriting process for valid information stored in the valid buffers 29, 52, 64, and 81 and the valid information portion 91C may be disposed.

As described above, the data supplying apparatus according to the present invention has an address buffer that stores information used to access a cache data unit. In addition, since the cache data unit and a cache tag unit are independently operated, the conventional instruction buffer and instruction buffer controlling unit can be omitted. Thus, the hardware resources can be reduced and data can be supplied from a simple structure.

Figure 1A:
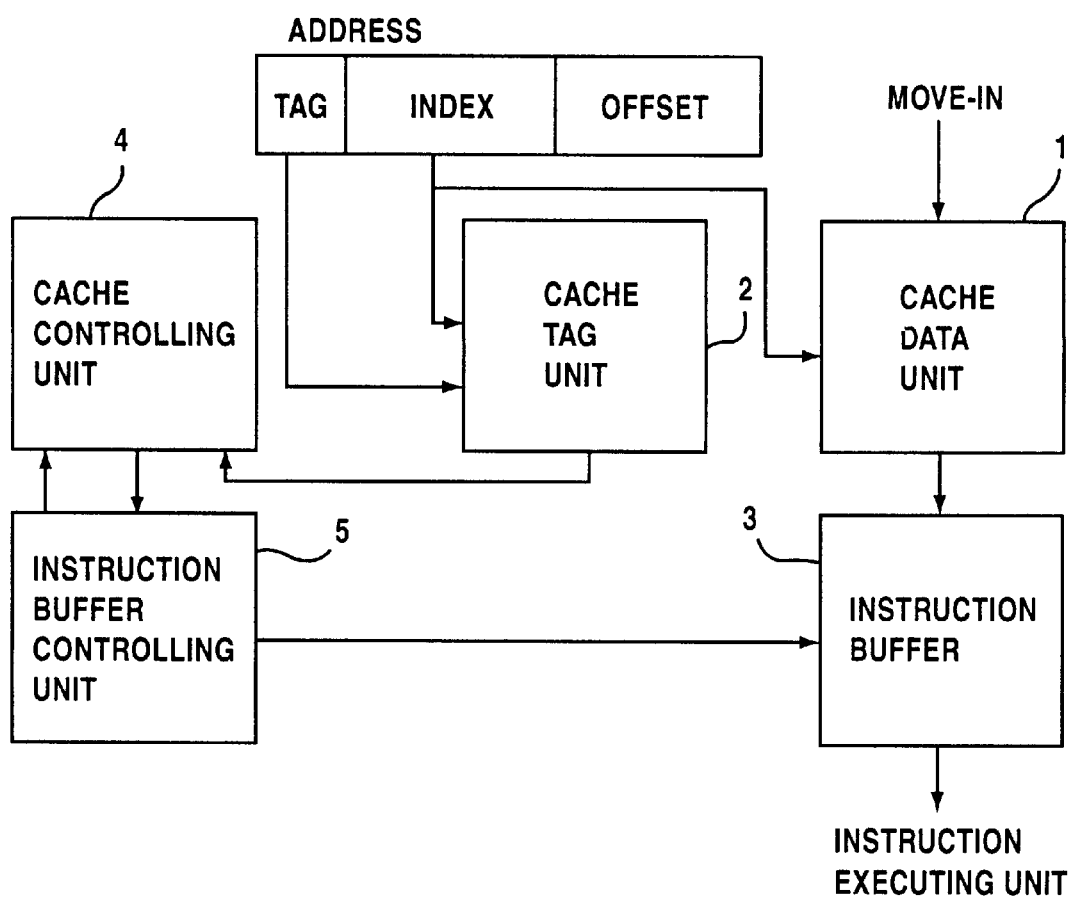
FIG. 1A is a block diagram showing a structure of a conventional instruction supplying apparatus.
Figure 1B:
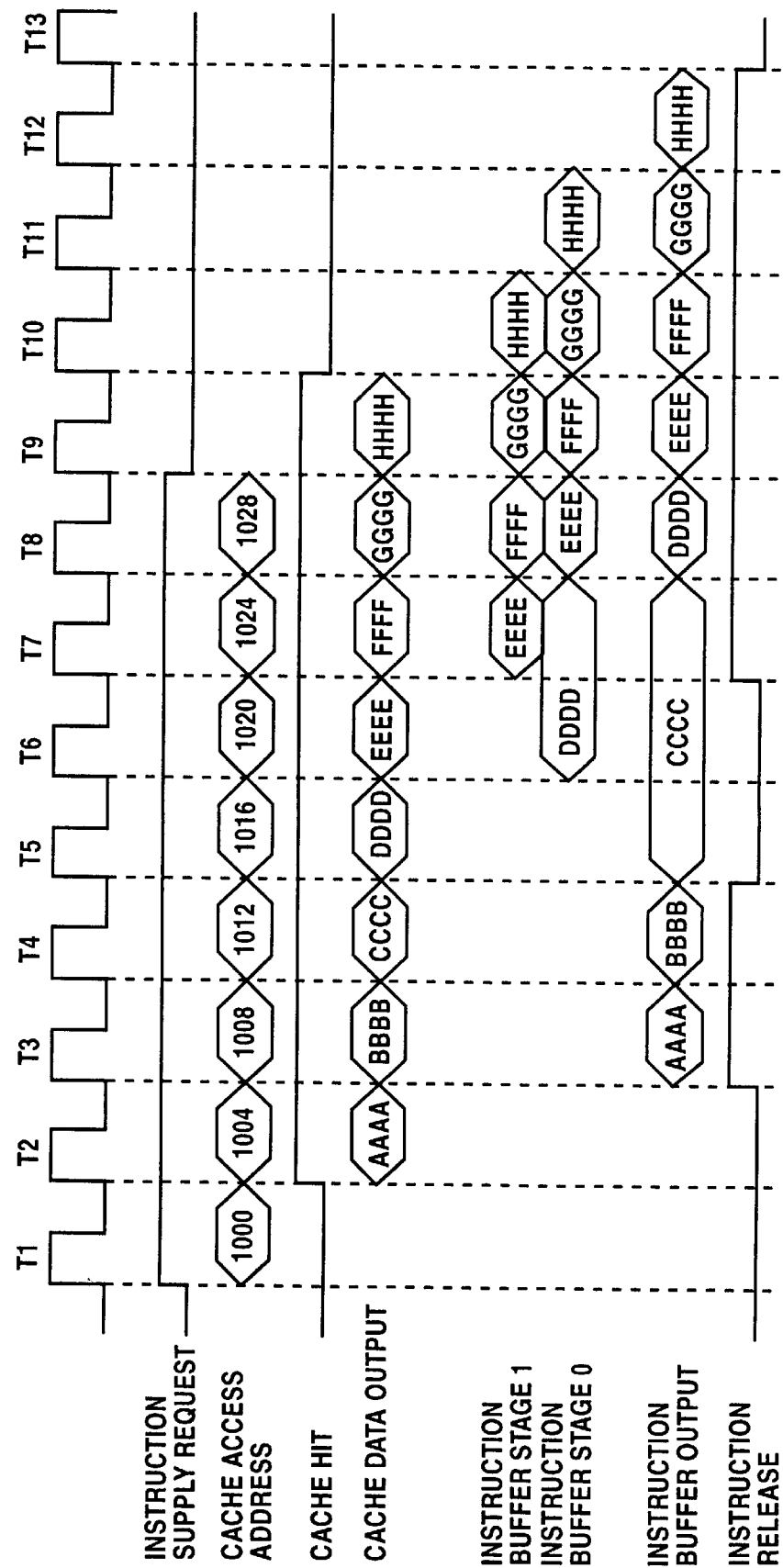
FIG. 1B is a timing chart showing a conventional instruction supplying operation.
Figure 1C:
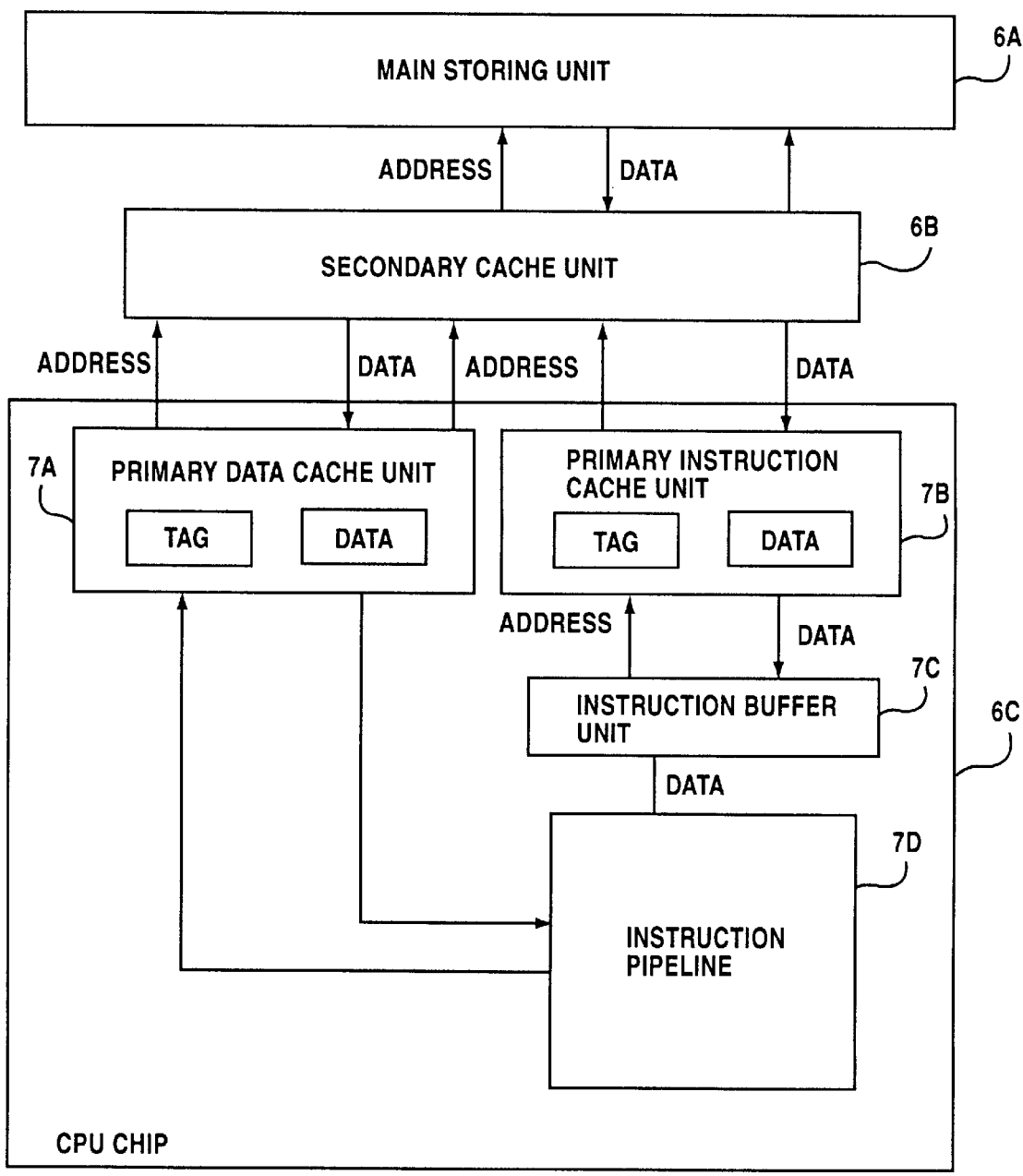
FIG. 1C is a block diagram showing a hierarchical structure of cache units.

The data supplying apparatus can be applied for both the primary data cache unit 7A and the primary instruction cache unit 7B shown in FIG. 1C. In addition, the data supplying apparatus can be applied for the secondary cache unit 6B. The relation between the secondary cache unit 6B and the primary instruction cache unit 7B is the same as the relation between the primary instruction cache unit 7B and the instruction buffer unit 7C. Instead of the primary instruction cache unit 7B, an address buffer circuit may be disposed in the secondary cache unit 6B.

The structure of which the address buffer circuit is disposed in the secondary cache unit 6B is especially useful when a system-on-chip that includes a CPU, a secondary cache, and a main memory, will be used in the future.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. An instruction supplying apparatus having a data memory storing instruction data and a tag memory storing first address information corresponding to the instruction data, and adapted for outputting instruction data stored in the instruction data memory corresponding to an instruction request from an instruction requesting unit, comprising:

an output buffer circuit storing the instruction data output from the data memory and outputting the stored instruction data;

an address buffer circuit storing information that is input corresponding to second address information included in the instruction request and that is used to access the data memory when said output buffer circuit has instruction data and a data release signal is not issued by the instruction requesting unit, and when said output buffer circuit has instruction data and information is present in said address buffer circuit; and an access circuit accessing the data memory with information stored in said address buffer circuit and enabling the data memory to output instruction data to said output buffer circuit, said access circuit accessing the data memory independently from an accessing operation for the tag memory with the second address information.

2. The instruction supplying apparatus as set forth in claim 1, wherein said address buffer circuit has a plurality of stages for buffering a plurality of pieces of information used to access the data memory in the input order of the information and for outputting the information in the input order.

3. The instruction supplying apparatus as set forth in claim 1, wherein said address buffer circuit is adapted for storing valid information that represents whether instruction data in the data memory is valid corresponding to the information used to access the data memory.

4. The instruction supplying apparatus as set forth in claim 1, wherein said address buffer circuit is adapted for storing the second address information as the information used to access the data memory.

5. The instruction supplying apparatus as set forth in claim 1, wherein said address buffer circuit is adapted for storing information that represents the position of the second address information in the tag memory as the information used to access the data memory.

6. The instruction supplying apparatus as set forth in claim 1, wherein said access circuit is adapted for determining whether or not said address buffer circuit is empty and accessing the data memory with the information that is used to access the data memory and that is input corresponding to the second address information.

7. The instruction supplying apparatus as set forth in claim 1, wherein said data memory is adapted for outputting relevant instruction data corresponding to information received from said access circuit.

8. An instruction supplying apparatus, comprising:

a tag memory storing first address information and outputting a comparison result of third address information included in an instruction request from an instruction requesting unit with the first address information;

an output buffer circuit storing instruction data and outputting the stored instruction data;

an address buffer circuit storing information used to access instruction data corresponding to the third address information when said output buffer circuit has instruction data and a data release signal is not issued by the instruction requesting unit, and when said output buffer circuit has instruction data and information is present in said address buffer circuit; and a data memory storing instruction data corresponding to the first address information and outputting instruction data that is accessed with information stored in said address buffer circuit to said output buffer circuit, said data memory outputting the instruction data independently from a comparing operation of said tag memory.

9. An instruction supplying method, comprising the steps of:

storing instruction data to be output to an output buffer to a first memory;

storing first address information corresponding to the instruction data to a second memory;

storing information used to access the first memory to an address buffer correspondingly to second address information included in an instruction request from an instruction requesting unit when said output buffer has instruction data and a data release signal is not issued by the instruction requesting unit, and when said output buffer has instruction data and information is present in said address buffer;

accessing the first memory with information stored in the address buffer independently from an accessing operation to the second memory with the second address information; and outputting instruction data corresponding to the instruction request from the first memory to said output buffer.

10. The instruction supplying method as set forth in claim 9, further comprising:

buffering a plurality of pieces of information used to access the first memory in the address buffer in the input order and outputting the pieces of information from the address buffer in the input order.

11. The instruction supplying method as set forth in claim 9, further comprising:

determining whether or not the address buffer is empty; and accessing the first memory with information that is input corresponding to the second address information and that is used to access the first memory when the address buffer is empty.

* * * * *